(12) United States Patent
Wentink

(10) Patent No.: US 8,787,988 B2
(45) Date of Patent: Jul. 22, 2014

(54) POWER MANAGEMENT FOR WIRELESS DIRECT LINK

(75) Inventor: Menzo Wentink, Utrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 2145 days.

(21) Appl. No.: 11/035,065

(22) Filed: Jan. 14, 2005

(65) Prior Publication Data

US 2005/0122927 A1    Jun. 9, 2005

Related U.S. Application Data

(63) Continuation-in-part of application No. 10/880,367, filed on Jun. 30, 2004, now Pat. No. 8,050,360, which is a continuation-in-part of application No. 10/353,391, filed on Jan. 29, 2003, now Pat. No. 6,791,962.

(60) Provisional application No. 60/536,254, filed on Jan. 14, 2004.

(51) Int. Cl.
    *H04M 1/00*    (2006.01)

(52) U.S. Cl.
    USPC ........................................................ 455/574

(58) Field of Classification Search
    USPC ................ 455/522.1, 552.1, 553.1, 13.4, 455/571–574, 70, 343.2, 343.4, 41.2, 127.1, 455/127.5; 370/311
    See application file for complete search history.

(56) References Cited

U.S. PATENT DOCUMENTS

| | | |
|---|---|---|
| 5,371,734 A | 12/1994 | Fischer |
| 5,463,659 A | 10/1995 | Nealon et al. |
| 5,487,069 A | 1/1996 | O'Sullivan |
| 5,537,414 A | 7/1996 | Takiyasu et al. |

(Continued)

FOREIGN PATENT DOCUMENTS

| | | |
|---|---|---|
| DE | 102 28 342 A1 | 9/2003 |
| EP | 1168676 | 1/2002 |
| WO | WO 2004/077920 A2 | 9/2004 |

OTHER PUBLICATIONS

Search report for co-pending PCT Application No. PCT/US05/01303 dated Nov. 1, 2006.

(Continued)

*Primary Examiner* — Joel Ajayi

(57) ABSTRACT

Disclosed herein are exemplary techniques for managing power in a direct wireless link between two wireless devices. The present invention provides at least three direct link power management techniques: Fast Resumption Mode (FRM) wherein the direct link is resumed automatically at a specified timing synchronization function (TSF); Slow Resumption Mode (SRM) wherein the direct link may be resumed by sending a Resume-Request via the access point; and Reverse Polling (RP), wherein one peer station of the direct link is continually awake and the other peer station uses reverse polling to start a service period. Thus, a method for power management of a direct wireless link between two wireless devices is disclosed. The method comprising the steps of establishing a direct wireless link between the first wireless device and the second wireless device; transmitting, from a first wireless device, a frame having a time value; receiving, at the second wireless device, the frame from the first wireless device; suspending the direct wireless link a duration determined based on the time value; and resuming the direct wireless link at a time determined based on the time value.

37 Claims, 28 Drawing Sheets

(56) References Cited

U.S. PATENT DOCUMENTS

| | | | |
|---|---|---|---|
| 5,636,220 A | 6/1997 | Vook | |
| 5,752,201 A * | 5/1998 | Kivari | 455/574 |
| 5,768,531 A | 6/1998 | Lin | |
| 5,822,682 A | 10/1998 | Schroderus et al. | |
| 5,862,142 A | 1/1999 | Takiyasu et al. | |
| 5,991,287 A | 11/1999 | Diepstraten et al. | |
| 5,995,849 A | 11/1999 | Williams | |
| 5,999,127 A | 12/1999 | Dezelan | |
| 6,047,178 A | 4/2000 | Frlan | |
| 6,052,557 A * | 4/2000 | Kinnunen et al. | 455/9 |
| 6,084,865 A | 7/2000 | Dent | |
| 6,119,014 A | 9/2000 | Alperovich et al. | |
| 6,192,230 B1 | 2/2001 | van Bokhorst et al. | |
| 6,208,627 B1 | 3/2001 | Menon et al. | |
| 6,222,842 B1 | 4/2001 | Sasyan et al. | |
| 6,292,672 B1 | 9/2001 | Chavez, Jr. | |
| 6,301,609 B1 | 10/2001 | Aravamudan et al. | |
| 6,339,713 B1 | 1/2002 | Hansson et al. | |
| 6,360,277 B1 | 3/2002 | Ruckley et al. | |
| 6,415,146 B1 | 7/2002 | Capece | |
| 6,424,820 B1 | 7/2002 | Burdick et al. | |
| 6,430,604 B1 | 8/2002 | Ogle et al. | |
| 6,463,290 B1 | 10/2002 | Stilp et al. | |
| 6,470,058 B1 | 10/2002 | Michalski et al. | |
| 6,484,027 B1 | 11/2002 | Mauney et al. | |
| 6,487,180 B1 | 11/2002 | Borgstahl et al. | |
| 6,496,694 B1 | 12/2002 | Menon et al. | |
| 6,507,739 B1 | 1/2003 | Gross et al. | |
| 6,525,690 B2 | 2/2003 | Rudow et al. | |
| 6,529,748 B1 * | 3/2003 | Bruner | 455/574 |
| 6,539,232 B2 | 3/2003 | Hendrey et al. | |
| 6,542,748 B2 | 4/2003 | Hendrey et al. | |
| 6,542,749 B2 | 4/2003 | Tanaka et al. | |
| 6,542,750 B2 | 4/2003 | Hendrey et al. | |
| 6,574,266 B1 | 6/2003 | Haartsen | |
| 6,580,704 B1 | 6/2003 | Wellig et al. | |
| 6,594,666 B1 | 7/2003 | Biswas et al. | |
| 6,618,005 B2 | 9/2003 | Hannah et al. | |
| 6,625,456 B1 | 9/2003 | Busso et al. | |
| 6,665,520 B2 | 12/2003 | Romans | |
| 6,759,956 B2 | 7/2004 | Menard et al. | |
| 6,778,515 B2 | 8/2004 | Bolgiano et al. | |
| 6,785,251 B2 | 8/2004 | Bolgiano et al. | |
| 6,788,688 B2 | 9/2004 | Trebes, Jr. | |
| 6,791,962 B2 | 9/2004 | Wentink | |
| 6,795,701 B1 | 9/2004 | Baker et al. | |
| 6,799,056 B2 | 9/2004 | Curley et al. | |
| 6,810,246 B1 | 10/2004 | Kalofonos et al. | |
| 6,842,460 B1 * | 1/2005 | Olkkonen et al. | 370/465 |
| 6,925,286 B1 | 8/2005 | Kraiem et al. | |
| 6,968,179 B1 | 11/2005 | De Vries | |
| 7,095,722 B1 | 8/2006 | Walke et al. | |
| 7,233,792 B2 | 6/2007 | Chang | |
| 7,245,592 B2 * | 7/2007 | Soomro et al. | 370/311 |
| 7,251,235 B2 | 7/2007 | Wentink | |
| 7,260,392 B2 | 8/2007 | Kitchin | |
| 7,308,202 B2 | 12/2007 | Roes et al. | |
| 7,450,550 B2 | 11/2008 | Jin | |
| 7,508,799 B2 | 3/2009 | Sumner et al. | |
| 7,545,771 B2 | 6/2009 | Wentink | |
| 2001/0031626 A1 * | 10/2001 | Lindskog et al. | 455/67.3 |
| 2002/0025839 A1 * | 2/2002 | Usui | 455/574 |
| 2002/0087724 A1 | 7/2002 | Datta et al. | |
| 2002/0159544 A1 * | 10/2002 | Karaoguz | 375/329 |
| 2002/0168040 A1 | 11/2002 | Coffey | |
| 2002/0168993 A1 | 11/2002 | Choi et al. | |
| 2002/0172186 A1 | 11/2002 | Larsson | |
| 2003/0036354 A1 * | 2/2003 | Lee et al. | 455/41 |
| 2003/0063589 A1 | 4/2003 | Haines et al. | |
| 2003/0080992 A1 | 5/2003 | Haines | |
| 2003/0096576 A1 | 5/2003 | Salonidis et al. | |
| 2003/0185241 A1 * | 10/2003 | Lu et al. | 370/476 |
| 2003/0198196 A1 | 10/2003 | Bahl et al. | |
| 2003/0210658 A1 | 11/2003 | Hernandez et al. | |
| 2004/0005861 A1 | 1/2004 | Tauchi | |
| 2004/0095907 A1 | 5/2004 | Agee et al. | |
| 2004/0125775 A1 | 7/2004 | Rios | |
| 2004/0125776 A1 * | 7/2004 | Haugli et al. | 370/338 |
| 2004/0147249 A1 | 7/2004 | Wentink | |
| 2004/0184456 A1 | 9/2004 | Binding et al. | |
| 2004/0192413 A1 | 9/2004 | Frank | |
| 2004/0203698 A1 | 10/2004 | Comp | |
| 2004/0242154 A1 | 12/2004 | Takeda et al. | |
| 2004/0246934 A1 | 12/2004 | Kim | |
| 2005/0030976 A1 | 2/2005 | Wentink | |
| 2005/0094588 A1 | 5/2005 | Wentink | |
| 2005/0135305 A1 | 6/2005 | Wentink | |
| 2005/0265305 A1 | 12/2005 | Furukawa et al. | |
| 2006/0148406 A1 | 7/2006 | Strater et al. | |

OTHER PUBLICATIONS

Search report for co-pending PCT Application No. PCT/US04/033487 dated Feb. 2, 2005.

IEEE Std 801.11e/D3.0, Draft Supplemental to Standard for Telecommunications and Information Exchange Between Systems—LAN/MAN Specification, pp. 1-140, May 2002.

Ho et al., MediaPlex—An IEEE 802.11 Enhanced Protocol for QoS-Driven Wireless LANs, IEEE, pp. 1-25, Nov. 3, 2000.

Kitchin, Wireless Address Resolution Protocol, IEEE, pp. 1-13 Jan. 2002.

Diepstraten et al., 802.11 Tutorial, IEEE, pp. 1-22, Mar. 1996.

Kandala et al., "Suggested changes to normative text of WARP," IEEE, pp. 1-11, Jun. 2002.

Ni et al., QoS Issues and Enhancements for IEEE 802.11 Wireless LAN, INRIA, pp. 1-34, Nov. 2002.

Wentink, "Direct Stream Request Protocol (DSRP)," IEEE, pp. 1-16, Jul. 2002.

PanGo Networks, PanGo Mobile Applications Suite, Intelligent Wireless, Copyright 2003, 2 pages.

PanGo Networks, PanGo "Proximity Platform," Intelligent Wireless, Copyright 2003, 2 pages.

PanGo Networks, "Mobile Applications Suite," Intelligent Wireless, Copyright 2003, 1 page.

Donovan, Jeremey, "Location awareness beyond E911," EETimes, Jun. 9, 2003, 1 page.

PanGo Networks, "Overview," Intelligent Wireless, Copyright 2003, 1 page.

PanGo Networks, "Technology, How it Works," Intelligent Wireless, Copyright 2003, 1 page.

Palm, Palm: Providing Fluid Connectivity in a Wireless World, 2002, 10 pages.

ETSI TR 101 683 V1.1.1, Broadband Radio Access Networks; HIPERLAN Type 2; System Overview, pp. 1-19, 2000.

Kamerman et al., WaveLan-II: A High-Performance Wirelss LAN for the Unlicensed Band, Bell Labs Technical Journal, pp. 118-133, 1997.

Notice of Allowance on U.S. Appl. No. 10/880,366, mailed May 28, 2010.

Office Action on U.S. Appl. No. 12/460,974, mailed Mar. 24, 2010.

Notice of Allowance on U.S. Appl. No. 10/880,366, mailed Nov. 26, 2010.

Notice of Allowance on U.S. Appl. No. 10/977,470, mailed Jan. 6, 2011.

Final Office Action on U.S. Appl. No. 13/351,588, mailed Aug. 15, 2013.

Non-final Office Action on U.S. Appl. No. 10/880,367, mailed Aug. 3, 2010.

Final Office Action on U.S. Appl. No. 13/271,394, mailed Nov. 5, 2012.

Non-Final Office Action on U.S. Appl. No. 10/977,490, mailed Sep. 14, 2011.

Notice of Allowance on U.S. Appl. No. 12/460,974, mailed Sep. 21, 2011.

Final Office action on U.S. Appl. No. 12/460,974, mailed Jan. 27, 2011.

Non-final Office Action on U.S. Appl. No. 10/880,367, mailed Jan. 21, 2011.

(56) References Cited

OTHER PUBLICATIONS

Notice of Allowance on U.S. Appl. No. 10/880,367, mailed Jul. 21, 2011.

Final Office Action on U.S. Appl. No. 10/977,490, mailed Mar. 5, 2012.

Non-Final Office Action on U.S. Appl. No. 13/271,394, mailed Mar. 12, 2012.

Notice of Allowance on U.S. Appl. No. 13/271,394, mailed Jan. 22, 2013.

* cited by examiner

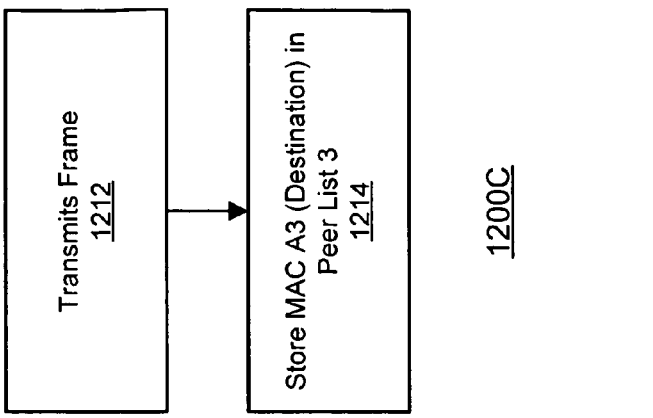
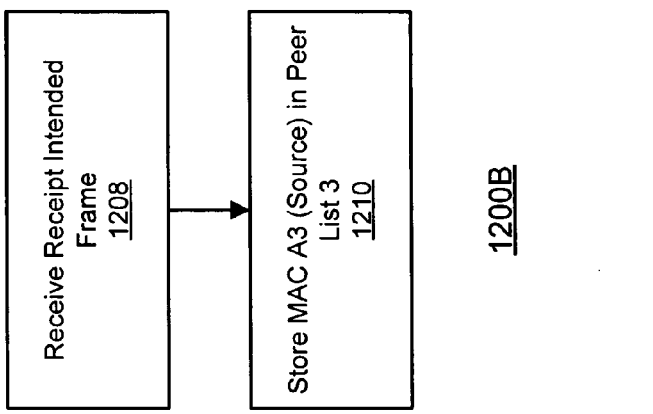
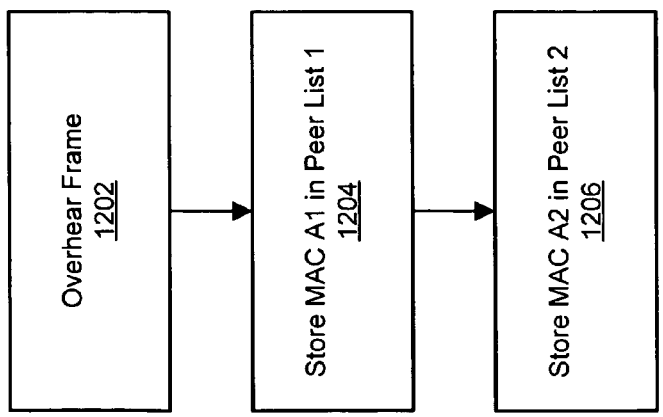

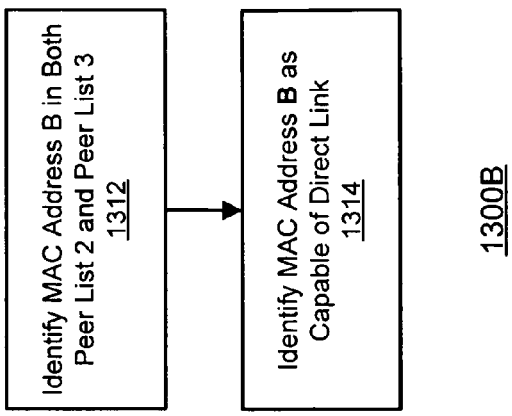
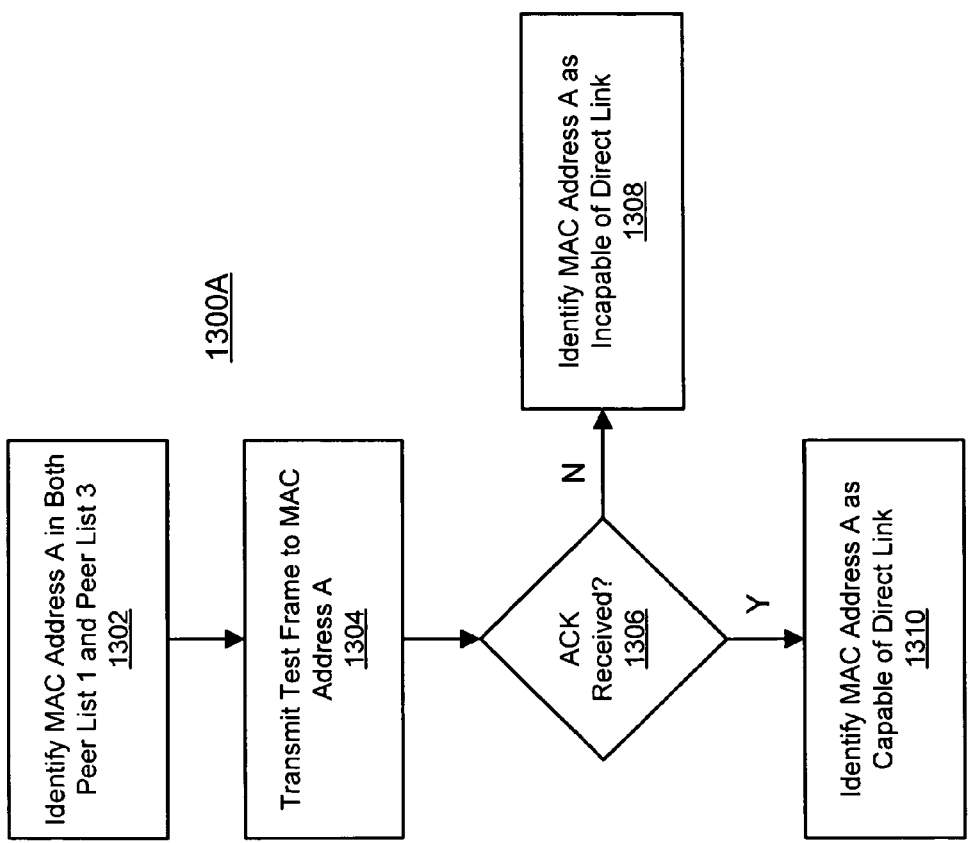

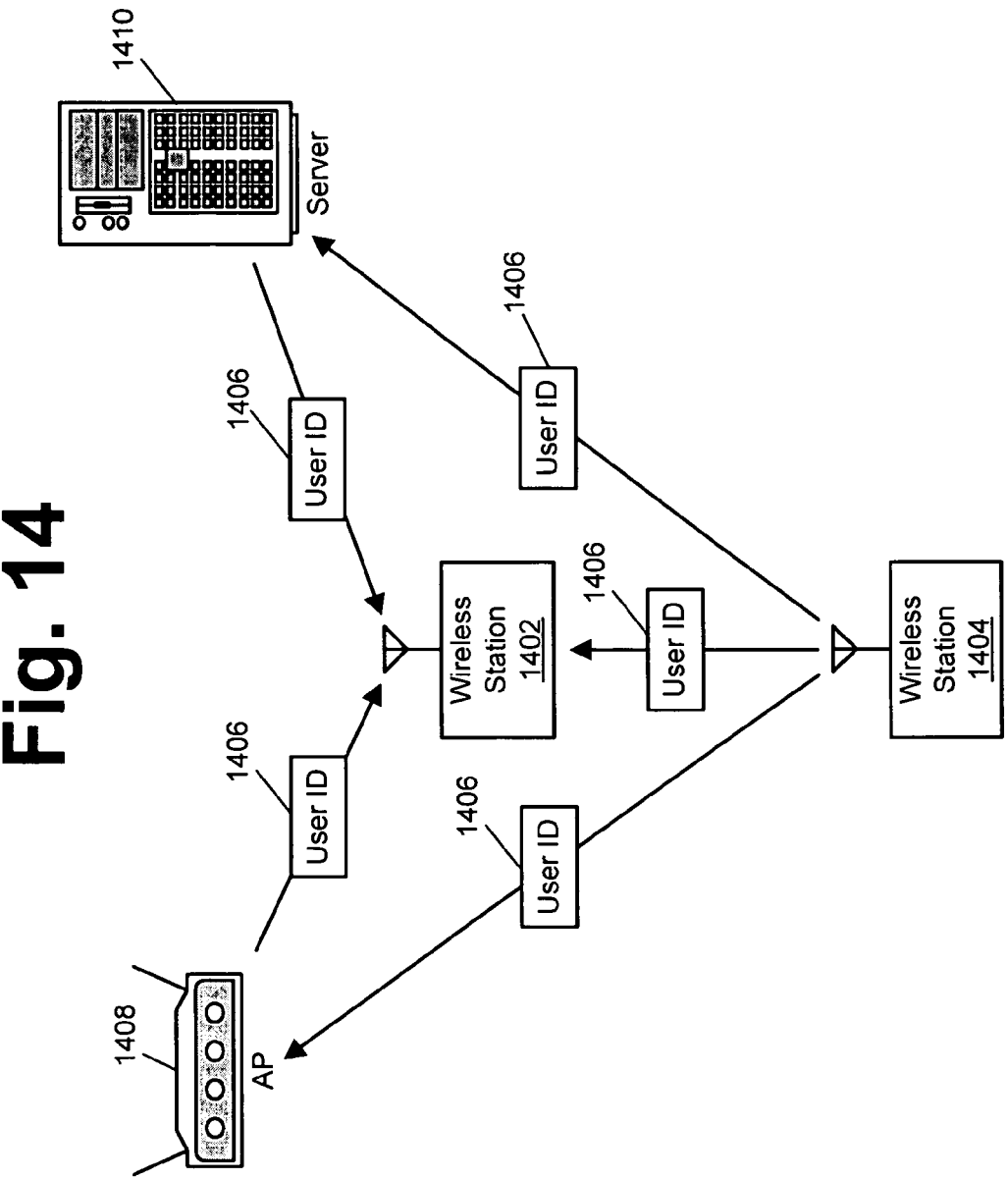

Node A shall be awake at the specified Wakeup TSF

A

Node A may go to
sleep after receiving a
frame with the EOSP
bit set

⟶ Frame with the EOSP bit set
+ Wakeup TSF IE

B (CAN)

Node B shall cease
further transmissions
to A after sending a
frame with the EOSP
bit set

Fig. 27

POWER MANAGEMENT FOR WIRELESS DIRECT LINK

CROSS-REFERENCE TO RELATED APPLICATIONS

The present application is a continuation-in-part of U.S. patent application Ser. No. 10/880,367 filed Jun. 30, 2004 which itself claims benefit to U.S. Provisional Application No. 60/515,701 filed Oct. 31, 2003 and which is a continuation-in-part of U.S. patent application Ser. No. 10/353,391 filed Jan. 29, 2003, now U.S. Pat. No. 6,791,962, entitled "Direct Link Protocol In Wireless Local Area," which also claims the benefit of U.S. Provisional Application No. 60/388,569 filed Jun. 12, 2002, the disclosures of each of which are herein incorporated by reference in their entireties.

The present application also claims benefit to U.S. Provisional Patent Application No. 60/536,254 filed Jan. 14, 2004 and entitled "Power Management In Direct Wireless Link," the disclosures of which is herein incorporated by reference in its entirety.

BACKGROUND OF THE INVENTION

The present invention relates generally to location awareness in wireless networks and more particularly to power management in wireless devices connected via a direct link.

Various wireless standards, such as Institute of Electrical and Electronics Engineers (IEEE) standards 802.11 a/b/c/e/g/i (referred to collectively as IEEE 802.11), provide for wireless connectivity between a wireless station and an infrastructure network (e.g., the Internet) via an access point. Processes covered by these standards include the association of a wireless station with an access point, the transmission of data from wireless station to infrastructure network, and vice versa, via the access point, communication between wireless stations via an access point, and the like.

Some wireless standards, such as the direct link protocol (DLP) proposed for inclusion in IEEE 802.11e, provide a technique for initiating direct communications between wireless stations without the access point acting as an intermediary for the forwarding the data frames. The direct communications are commonly referred to as a wireless "direct link." These conventional direct link processes, however, require active cooperation from the access point in initiating and establishing the direct link. It will be appreciated that the access point may be configured to prevent the establishment of a direct link or may be incapable of supporting direct link capabilities (e.g., modulation type) preferred by the wireless stations. Wireless stations using conventional direct link techniques therefore may be unable to establish a direct link or may restricted to establishing and using a direct link with capabilities limited to the supported capabilities of the access point. Moreover, these conventional direct link specifications (IEEE 802.11e DLP and IDLP) fail to provide an adequate technique to allow peer stations to enter a sleep state during the existence of a direct link connecting the peers. Thus, both peers remain in the awake state during the direct link and needlessly drain power from their power supplies.

Accordingly, techniques for effective power management in wireless stations connected by direct links would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

The present invention provides at least three direct link power management techniques: Fast Resumption Mode (FRM) wherein the direct link is resumed automatically at a specified timing synchronization function (TSF); Slow Resumption Mode (SRM) wherein the direct link may be resumed by sending a Resume-Request via the access point; and Reverse Polling (RP), wherein one peer station of the direct link is continually awake and the other peer station uses reverse polling to start a service period. In accordance with an aspect of this invention, a method for power management of a direct wireless link between two wireless devices is disclosed. The method comprising the steps of establishing a direct wireless link between the first wireless device and the second wireless device; transmitting, from a first wireless device, a frame having a time value; receiving, at the second wireless device, the frame from the first wireless device; suspending the direct wireless link a duration determined based on the time value; and resuming the direct wireless link at a time determined based on the time value.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIGS. 11, 12A-12C, 13A, and 13B are schematic and flow diagrams illustrating an exemplary technique for identifying wireless stations within a transmission/reception range of another wireless station in accordance with at least one embodiment of the present invention.

FIG. 14 is a schematic diagram illustrating a technique for obtaining one or more user identifications (IDs) associated with a proximate wireless station in accordance with at least one embodiment of the present invention.

FIGS. 20-29 are schematic diagrams illustrating various exemplary power management techniques in accordance with at least one embodiment of the present invention.

DETAILED DESCRIPTION OF THE INVENTION

The following description is intended to convey a thorough understanding of the present invention by providing a number of specific embodiments and details involving the identification of, and communication with, proximate wireless stations. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the various techniques of the present invention are discussed below in the context of IEEE 802.11-based wireless networking. However, those skilled in the art, using the teachings provided herein, may advantageously implement the disclosed techniques in other wireless networks. Accordingly, reference to techniques and components specific to IEEE 802.11, such as a media access control (MAC) addresses, applies also to the equivalent technique or component in other wireless network standards unless otherwise noted.

Figure 1:
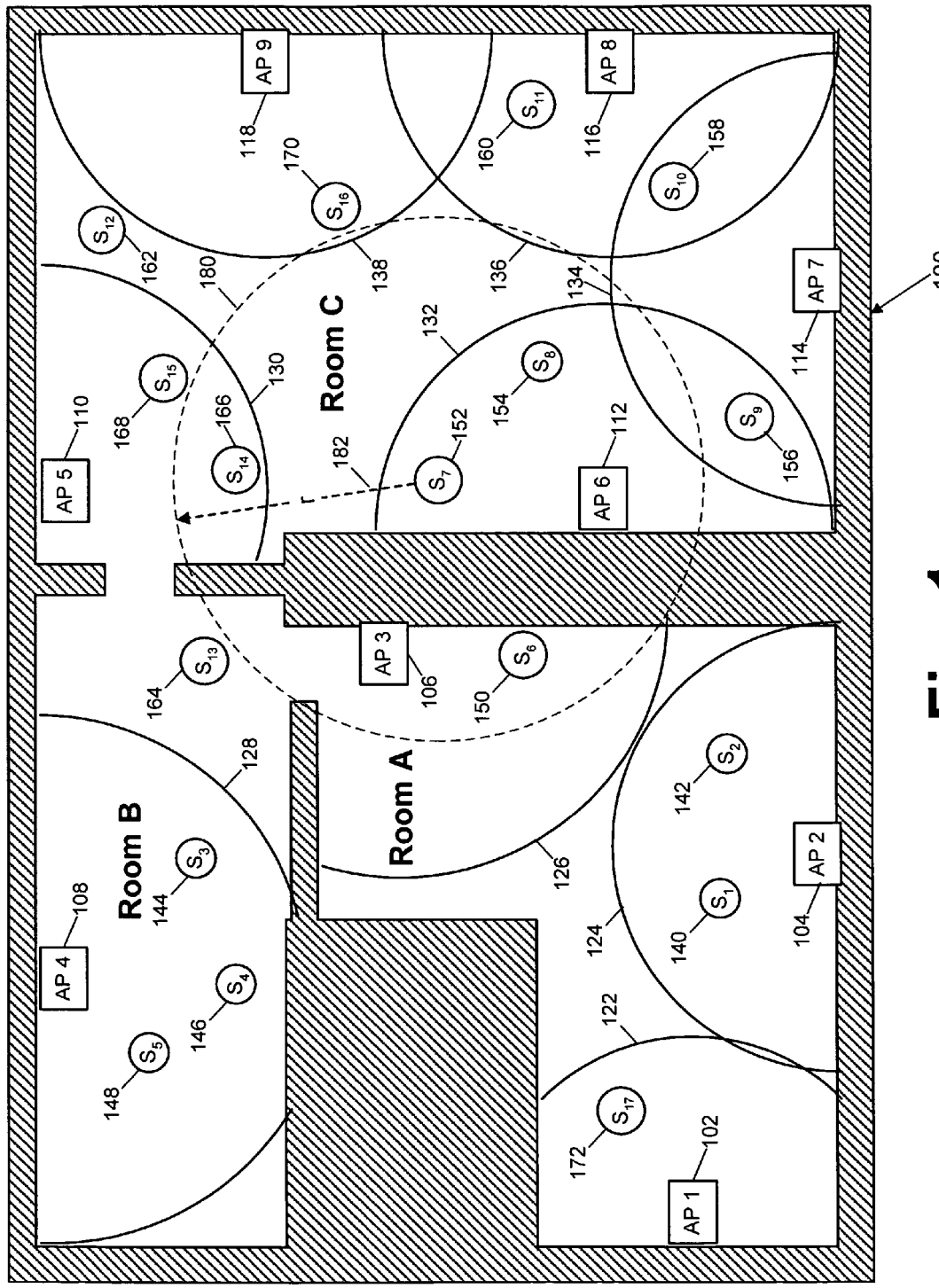
FIG. 1 is a top view of an exemplary building having wireless network access provided by a plurality of access points in accordance with at least one embodiment of the present invention.

Referring now to FIG. 1, an exemplary implementation of one or more techniques is illustrated in accordance with at least one embodiment of the present invention. FIG. 1 depicts a top view 100 of a building, where the building may include any of a variety of structures, such as, for example, an airport, a shopping mall, a factory, a business office, a school campus, a residence, and the like. Situated at various points within the buildings interior are a plurality of access points 102-118 (illustrated as AP1-AP9, respectively) having coverage areas 122-138, respectively. The access points 102-118 typically are connected via a backbone network (not illustrated) to form one or more extended service sets (ESSs). The backbone network in turn typically is connected to an infrastructure network, such as, for example, a wide area network (WAN), metropolitan area network (MAN), the Internet, etc. Thus, wireless network access to the infrastructure network may be provided to one or more wireless stations 140-172 (illustrated as $S_1$-$S_{17}$, respectively) that are positioned within one or more of the coverage areas 122-138.

The wireless stations 140-172 include devices enabled to communicate wirelessly using one or more protocols supported by one or more the access points 102-118. Such protocols may include, for example, the IEEE 802.11 protocols (802.11a/b/e/g/i, etc. Examples of wireless-enabled devices may include notebook (or "laptop") computers, handheld computers, desktop computers, workstations, servers, portable digital assistants (PDAs), cellular phones, etc.

In conventional wireless applications, a wireless station typically is unaware of the position or proximity of wireless stations and is further unaware of the one or more user IDs associated with the users of nearby wireless stations. In many instances, however, a user of a wireless station may desire to receive notification of other users of proximate wireless stations. Particularly, a certain user may want to be notified of other users with whom the certain user has some sort of association (i.e., "associates" of the certain user). Accordingly, in one embodiment of the present invention, one or more of the wireless stations 140-172 may be adapted to identify proximate wireless devices and determine one or more user IDs associated with the user or users of the proximate wireless devices. A user's ID may include, for example, a login ID supplied by the user to enable the user's use of the wireless station, an email address associated with the user and used by an email client operating on the wireless station, a user ID associated with one or more software programs operating on the wireless station, such as an instant messenger client, and the like.

After determining the user ID(s) associated with a nearby station, the wireless station may automatically notify the user of the wireless station. Alternatively, in one embodiment, a filtering process may be performed to determine whether the user should be notified of a proximate station user. The filtering process may include, for example, comparing the user ID with a list of associate user IDs or applying one or more notification filter rules that govern the notification process. Examples of notification filter rules may include rules that prevent or allow notification of proximate users during certain time periods, at certain locations, or in other situations. Exemplary filtering processes are discussed in greater detail herein.

The user of the wireless station may be notified of proximate users in a variety of manners. For example, a pop-up window could be displayed on a display screen of the station that informs the user of the proximity of the identified proximate user and also may provide additional related information, such as, for example, a value representing the degree of proximity (e.g., a physical distance value). The pop-up window could be displayed in conjunction with a communications program operating on the wireless station, such as an email client or an instant messaging program. Notification also may be provided by, for example, automated speech output by a speaker of the station, transmitting an email to an email client operating on the wireless station, etc.

After receiving notification of proximate users or associates, a user may take any of a variety of actions, such as initiating communications with a proximate user via their respective wireless stations, attempting to locate the proximate user for a face-to-face meeting, etc. Communications between nearby wireless stations may be accomplished via conventional wireless techniques where data communications between two wireless stations are communicated via one or more access points and/or the backbone network. Alternatively, in one embodiment, if the nearby wireless stations are within each other's transmission range, a wireless direct link may be established between the nearby wireless stations whereby data is communicated directly between the wireless stations without assistance or interference from an access point.

After establishing a direct link with the proximate station, various types of information may be transmitted over the direct link. For example, the proximate users could establish an instant messaging session using the direct link, transmit email directly without routing the emails through the infrastructure network, conduct a videoconference over the direct link, and the like. As another example, if one station belongs to a business and the other station to a potential customer, the direct link formed between the stations could be used to send advertisements, promotionals, coupons, and the like, from the business to the potential customer. Thus, advertising could be targeted by the business to potential customers that are within a certain proximity of the business.

As described above, a user of a wireless station may be interested in learning of other users of wireless stations within a certain proximity. The proximity may be defined by the user, an access point, or a third party based at least in part on equipment capabilities and the desires of the user and/or administrator of the wireless network. Various exemplary definitions of proximity are described in the following using FIG. 1 for illustrative purposes. For ease of reference, the one or more conditions that define a proximity in a particular instance are collectively referred to herein as a proximity definition.

In at least one embodiment, wireless stations associated with a same access point (i.e., in a same basic service set or BSS) may be classified as proximate to each other. For example, the user of wireless station 144 may want be notified only of those wireless stations that are in the same coverage area 128 of access point 108 to which wireless station 144 is associated. In this case, wireless stations 146 and 148 may be considered as proximate to wireless station 144. In another embodiment, a user of certain wireless station may consider only those wireless stations that are associated with the same access point or another access point having a coverage area that overlaps or is immediately adjacent to the coverage area of the access point associated with the certain wireless station. For example, under this classification of proximity, wireless stations 156, 158 and 170 may be considered proximate to wireless station 160 because the access points 114, 118 associated with one or more of the wireless stations 156, 158 and 170 have coverage areas 134 and 138, respectively, which overlap or are immediately adjacent to coverage area 136 of access point 116. Further, in one embodiment, wireless stations may be considered proximate when they are associated with the same ESS. To illustrate, assume that access points 102-108 form an ESS that spans rooms A and B. In this case, wireless stations 140-150 and 172 may be considered proximate to each other as each is associated with an access point that is a member of the same ESS.

As described above, a proximity definition may be based at least in part on the physical proximity or logical proximity of the access points to which the wireless stations are associated. In other circumstances, however, a proximity definition may be substantially based on the physical proximity, or physical distance, between wireless stations. In one embodiment, proximity may be defined as a physical distance from a certain wireless station. For example, the user of the wireless station 152 may consider only those wireless stations within an area 180 described by a radius 182 as proximate wireless stations. Under this exemplary proximity definition, wireless stations 150, 154 and 166 would be proximate wireless stations while wireless station 156 would not even though it is associated with the same access point 112 as the wireless station 152. The dimensions of the proximate area may be defined in part by features of the area where the wireless station is located (e.g., the walls or ceiling), by the transmission/reception range of the wireless station (e.g., radius 182 may represent the maximum transmission range), or by the coverage areas of nearby access points.

Rather than, or in addition to, basing proximity on a distance from the wireless station, features of the room or building where the wireless station is located may be used to aid in defining proximity. For example, the contours of room A may set the boundary for an area considered proximate by a user of a wireless station located in room A. In another example, the wireless stations located in either room A or room B may be considered proximate to each other because rooms A and B are adjacent and wireless stations in either room B or room C may be considered proximate to each other because Rooms B and C are adjacent. Wireless stations in room A, however, may not be considered proximate to wireless stations in room C, and vice versa, in this example because the areas of room A and C are not adjacent.

In other embodiments, proximity may be defined based on both physical proximity of the wireless stations and the proximity of access points. For example, wireless stations may be considered to be proximate when they are located in the same room and are associated with the same ESS or are associated with access points having overlapping or adjacent coverage areas. Although various exemplary proximity definitions have been disclosed, other definitions of proximity may be utilized based on the teachings provided herein without departing from the spirit or the scope of the present invention.

Figure 2:
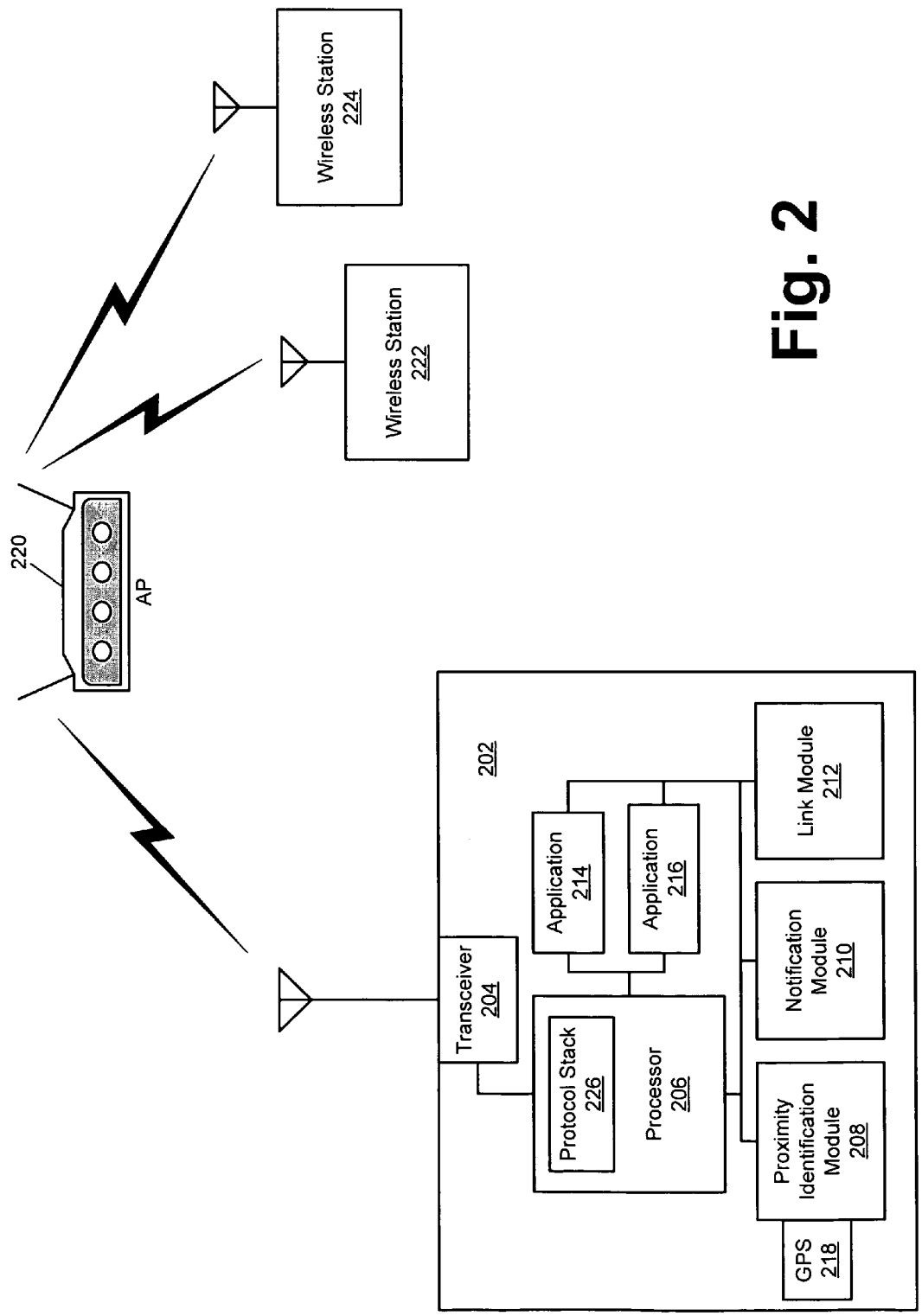
FIG. 2 is a schematic diagram illustrating an exemplary wireless station for identifying proximate wireless stations in accordance with at least one embodiment of the present invention.
Figure 3:
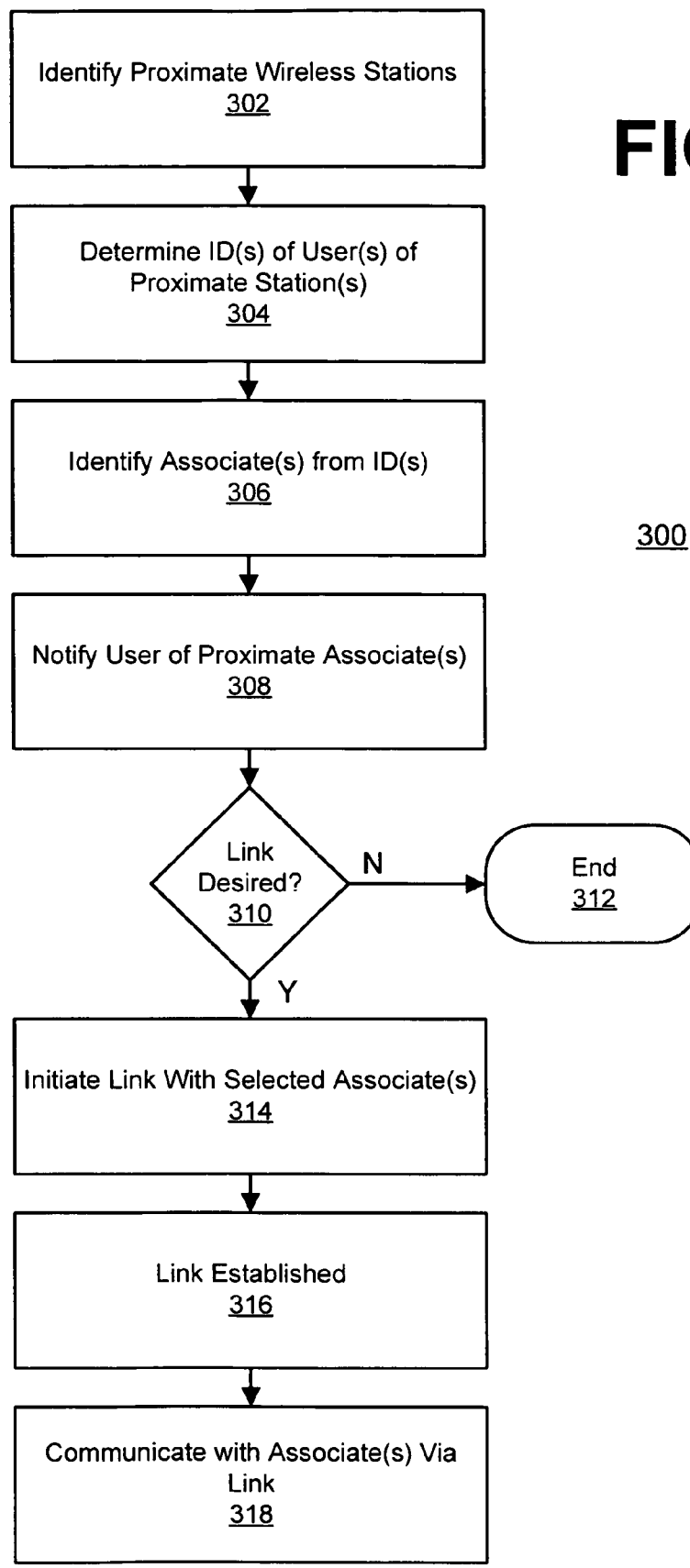
FIG. 3 is a flowchart illustrating an exemplary operation of the wireless station of FIG. 2 in accordance with at least one embodiment of the present invention.

Referring now to FIGS. 2 and 3, an exemplary wireless station 202 for implementing the various techniques described herein and an exemplary method 300 for its use are illustrated in accordance with at least one embodiment of the present invention. The wireless station 202 includes a radio frequency (RF) transceiver 204, one or more processors 206, a proximity identification module 208, a notification module 210 and a link module 212. The wireless station 202 further may include one or more software applications 214, 216. The software applications 214, 216 may include, for example, communications based applications such as an email client, an instant messaging client, videoconferencing software, and the like. The wireless station 202 further may include a global positioning system (GPS) receiver 218 for determining the position of the wireless station 202.

In at least one embodiment, data and other signaling is communicated between the wireless device 202 and one or more access points 220 or other wireless stations 222, 224 as frames represented by RF energy transmitted by and received via the RF transceiver 204. Incoming data from the RF transceiver 204 may be processed by the processor 206 using one or more protocol stacks 226, such as, for example, an Internet Protocol (IP) stack. The resulting extracted data may be used by the proximity identification module 208, the notification module 210, the link module 212 and/or one or more of the software applications 214, 216 as described herein. Similarly, data generated by one or more of the modules 208-212 and/or software applications 214, 216 may be encapsulated or otherwise processed by the processor 206 using the one or more protocol stacks 226 and transmitted to the access point 220 or wireless stations 222, 224 via the transceiver 204.

In at least one embodiment, the modules 208-210 are at least partially implemented as software executed by one or more processors 206 to perform the associated function. In other embodiments, some or all of the modules 208-210 may be implemented as hardware, firmware, or a combination thereof. For example, the modules 208-212 may be implemented as a software application installed on and executed by the wireless station 202 to perform the proximity detection, notification, and link establishment techniques described herein. Alternatively, the modules 208-212 may be implemented as software "plug-ins" for implementation in conjunction with another software application, such as an email client application.

Referring to FIG. 3, an exemplary method 300 illustrating an operation of the wireless station 202 is illustrated. The method 300 initiates at step 302 wherein the proximity identification module 208 identifies wireless stations proximate the wireless station 202 under one or more proximity definitions. In one embodiment, the proximity identification module 208 identifies proximate wireless stations using a direct polling approach as described with reference to FIG. 4. In another embodiment, the proximity identification module 208 identifies proximate wireless stations based at least in part on proximity information provided by the access point 220 or a proximity server implemented by, or connected to, the access point 220 as described with reference to FIGS. 6-10D. Alternatively, the proximity identification module 208 may identify proximate wireless stations using an automatic peer discovery technique as described with reference to FIGS. 12-14B. Other techniques for identifying proximate wireless stations may be implemented without departing from the spirit or the scope of the present invention.

At step 304, the proximity identification module 208 determines one or more user IDs associated with the identified proximate wireless stations. A user ID may include, for example, a login ID used to access the wireless station, an email address associated with a user of the wireless station, a user ID provided by the user in response to a request for identification, a user ID provided specifically for proximity identification purposes, etc. In one embodiment, the user ID of the user of a proximate wireless station may be received by the proximity identification module 208 as data transmitted by the proximate wireless station in response to a identification request transmitted by the proximity identification module 208. Alternatively, the user ID of a user of a proximate wireless station may be provided by the proximity server or the access point 220.

As noted above, in some instances the user of the wireless station 202 may want to be notified of a proximate station user only under certain conditions. For example, one condition may be that the proximate station user be associated in some way with the user of the wireless station 202, i.e., the proximate station user is an associate of the user of the wireless station 202. An associate may include, for example, a family member, a friend, a co-worker, a business associate, a fellow club member, etc. Accordingly, at step 306, the user IDs of proximate wireless stations may be compared to a list of user IDs related to identified associates of the user of the wireless station 202. In the event that the user ID of a proximate wireless station substantially matches a user ID on the list of associate IDs, the proximity identification module 208 may identify the user of the proximate wireless station as an associate. In other embodiments, however, the user of the wireless device 202 may opt to receive notification of proximate users regardless of an association, or lack thereof, with the user of the wireless device 202. In this case, step 306 may be omitted.

At step 308, the notification module 210 notifies the user of the wireless station 202 of the proximity of nearby station users. The notification module 210 may notify the user by, for example, displaying a display window having proximate user information on a display screen of the wireless station 202 for observation by the user, by playing an automated voice output identifying proximate users, by sending an email to an email client operating on the wireless station 202, etc.

In certain instances, however the notification module 210 performs a filtering process before notifying the user of proximate users. The filtering process may include subjecting the user IDs associated with the proximate wireless stations to one or more notification filter rules set by the user of wireless station 202. The one or more notification filter rules may include, for example, conditions relating to the time of notification, the place of notification, the means of notification, and the like. For example, the wireless station 202 may include a notebook computer and the user of the wireless station may work at an office with other workers having similarly configured notebook computers. The user therefore may not desire to receive notification of the proximity of associates at the office due to user's preexisting awareness that the other workers are proximate due to their co-employment at the same office. Accordingly, the user may set a notification filter rule whereby no notification is given for proximate users identified as coworkers when the wireless station 202 is within the confines of the user's office.

After notifying the user of proximate users, the user may be provided with the choice of whether to initiate a direct link with one or more proximate wireless stations. If the user does not want to establish a direct link, the user may so indicate at step 310 and the method 300 terminates at end step 312. Otherwise, the user may select one or more proximate users with whom the link module 212 may attempt to establish a direct link.

At step 314, the link module 212 may initiate the one or more direct link techniques to establish a direct link with the wireless station(s) of the selected proximate user(s). Any of a variety of techniques may be used to establish a direct link, two of which are discussed with reference to FIGS. 17-19. After a direct link is established at step 316, the user may communicate with the proximate user, and vice versa, via the direct link at step 318. Such communications may include instant messaging, direct email, video conferencing, etc.

Figure 4:
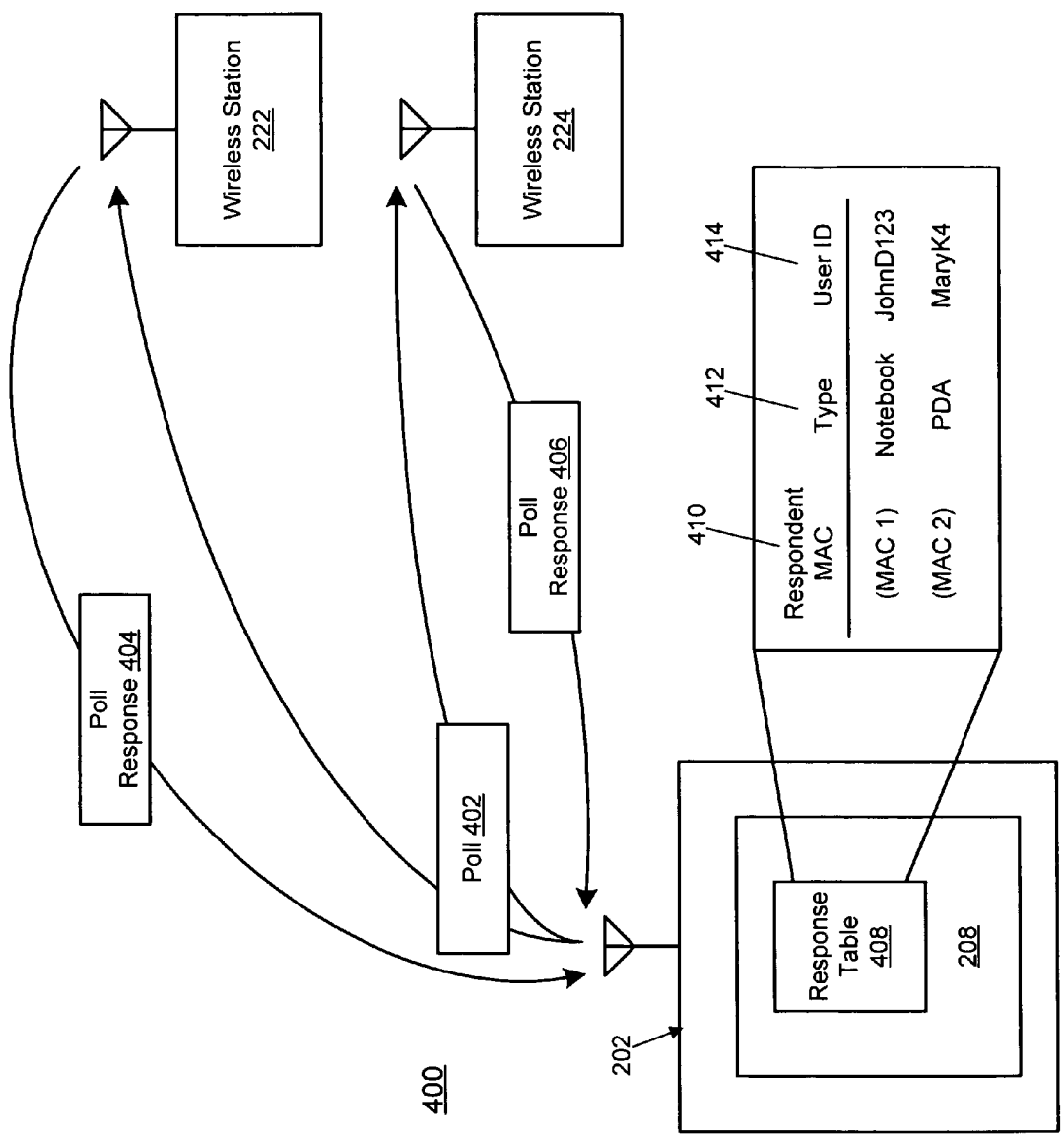
FIG. 4 is a schematic diagram illustrating an exemplary technique for identifying proximate wireless stations using direct polling in accordance with at least one embodiment of the present invention.

Referring now to FIG. 4, an exemplary direct polling technique 400 for identifying proximate wireless stations is illustrated in accordance with at least one embodiment of the present invention. In the illustrated example, the proximity identification module 208 of station 202 generates and provides for transmission a poll frame 402 having a broadcast or multicast MAC address in its destination address field. The poll frame 402 further may include, for example, data identifying the frame as a request for wireless devices to identify themselves upon receipt of the poll frame 402. In this case, the proximate wireless stations 222, 224 may prepare and transmit poll response frames 404 and 406, respectively, for receipt by the wireless station 202. The poll response frames 404 and 406 may include, for example, data representing the MAC address of the proximate wireless station sending the poll response frame, an indicator of the type of wireless station (e.g., PDA, notebook computer, cell phone, etc.), one or more user IDs associated with the wireless station, and the like.

It will be appreciated that the receipt of a poll response frame from a wireless station indicates a strong possibility that the wireless station is nearby. Based on this possibility, upon receipt of a broadcast response frame, the proximity identification module 208 may insert relevant data from the poll response frame into a response table 408 maintained at the wireless station 202. In other embodiments, rather than transmitting a poll response frame in response to a poll frame 402, the wireless stations 202, 222, and 224 may be adapted to periodically transmit a beacon frame, similar to the poll response frames 404 and 406, identifying the MAC address, type, user ID, etc., of the wireless station transmitting the beacon frame. Upon receipt of a beacon frame from another wireless station, the receiving wireless station may add information from the beacon frame to the response table 208.

In the illustrated example, the response table 408 includes an entry for each broadcast response frame received, the entry including the MAC address (column 410), type (column 412) and user ID (column 414) associated with the wireless station transmitting the response frame. Information from the response table 408 therefore may be used by the proximity identification module 408 and notification module 410 to identify proximate station users and to provide notification of their proximity.

Figure 5:
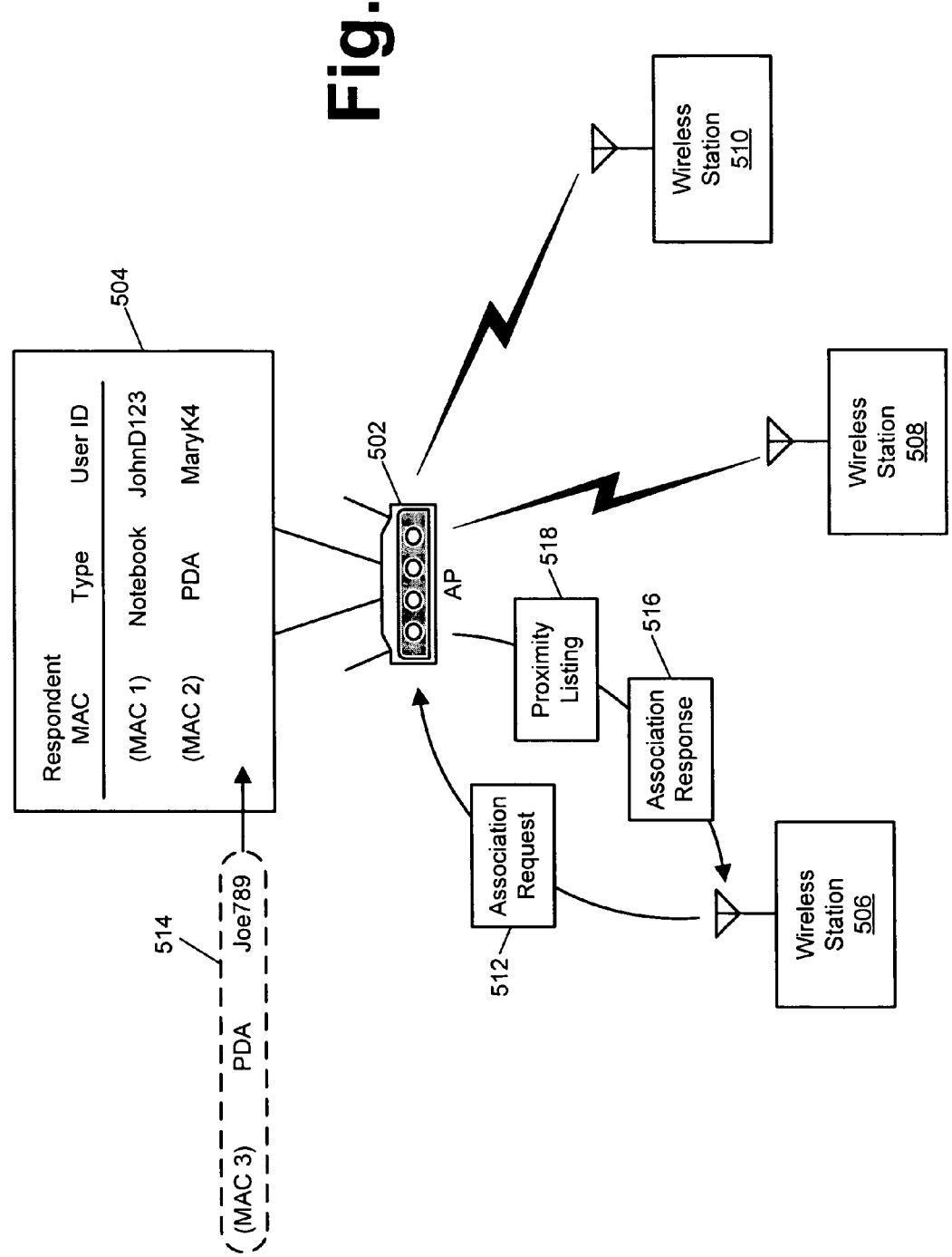
FIG. 5 is a schematic diagram illustrating an exemplary technique for identifying proximate wireless stations using proximity information maintained by an access point in accordance with at least one embodiment of the present invention.

Referring now to FIG. 5, an exemplary technique for identifying proximate wireless stations based on proximity information provided an access point is illustrated in accordance with at least one embodiment of the present invention. IEEE 802.11 and other wireless standards describe an association process whereby a wireless station that enters the coverage area of an access point may identify itself to the access point and request that the access point handle incoming and outgoing frames on behalf of the wireless station. In at least one embodiment, the access point and wireless device may be adapted to provide proximity information during or in response to the association process.

To illustrate, the access point 502 may be adapted to maintain an association table 504 that stores information relating to wireless stations associated with the access point 502. This information may include, for example, the MAC address of the wireless station, the type of wireless station, user ID(s) associated with the wireless station, etc.

When wireless device 506 enters the coverage area of the access point 502 (already associated with wireless stations 508 and 510), the wireless station 506 may transmit an association request frame 512 to the access point 502 requesting association with the access point 502. Information related to the wireless device 506 may be transmitted as part of the association request 512 or in subsequent frame(s). Upon receipt of the frame(s) containing information related to wireless station 506, the access point 502 may use this information to create an entry 514 in the associates table 504 for the wireless station 506.

As described in IEEE 802.11, the access point 502 conventionally responds to an association request frame 512 with an association response frame 516 indicating whether the association request of the wireless station 202 is successful, and if so, the association response frame 516 also generally includes an association ID for use by the wireless station 506. In one embodiment, the access point 502 may further respond to a successful association request by transmitting a proximity listing 518 to the wireless station 506 as part of the association response frame 516 or as one or more separate frames. The proximity listing 518 preferably includes information related to other wireless stations 506 and 508 associated with the access point 502, such as, for example, the proximate stations' MAC addresses, user IDs, type, GPS position, etc. The information presented in the proximity listing 518 may be culled from the associates table 504 maintained by the access point 502. The proximity identification module 208 may store part or all of the information of the proximity listing 518 in the response table 408 or similar table for use in identifying and providing notification of proximate users.

Figure 6:
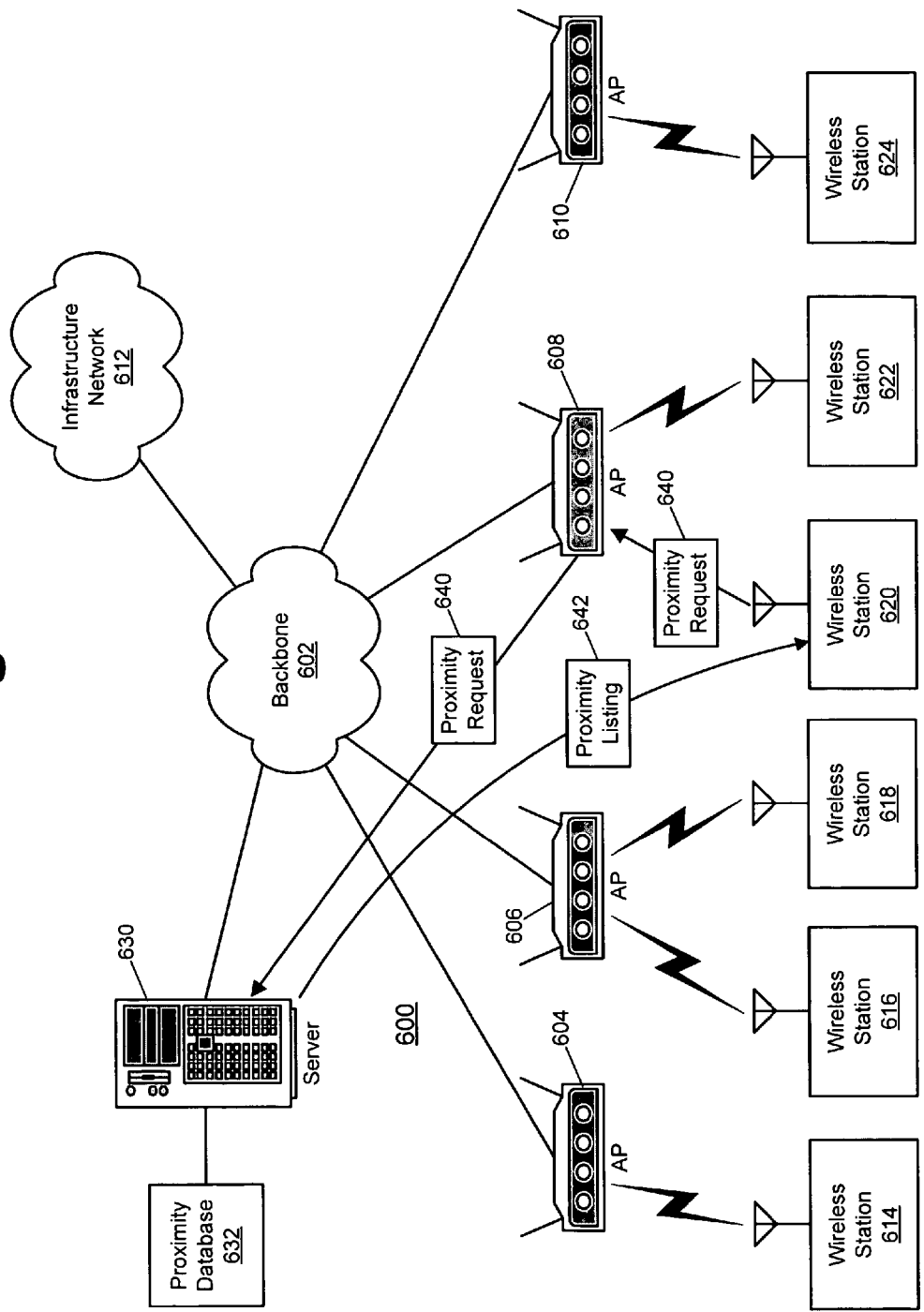
FIG. 6 is a schematic diagram illustrating an exemplary technique for identifying proximate wireless stations using proximity information maintained by a proximity server associated with an extended service set (ESS) in accordance with at least one embodiment of the present invention.

Referring now to FIG. 6, an exemplary system 600 and technique for providing proximity information in an ESS is illustrated in accordance with at least one embodiment of the present invention. System 600 includes a backbone network 602 connecting a plurality of access points 604-610 to form an ESS. The backbone network 602 is further connected to an infrastructure network 612 (e.g., the Internet) to provide network connectivity between wireless stations 614-624 and the infrastructure network 612.

The system 600 further includes a proximity server 630 operably connected to the access points 604-610 via the backbone network 602. In at least one embodiment, the notification server 630 may be adapted to monitor the physical and/or logical locations of wireless stations associated with the ESS. To facilitate this monitoring process, the proximity server 630 may be adapted to maintain, or have access to, a proximity database 632 storing various information related to the locations, positions, identities, types, connection capabilities, etc. of the wireless stations 614-624. Various examples of information that may be stored in the proximity database 632 are discussed below with reference to FIGS. 8, 9, and 10A-D.

Information stored in the proximity database 632 may be provided directly by the wireless stations 614-634, provided by the access points 604-610, or the proximity database 632 may obtain information from other sources. To illustrate, when a wireless station associates with one of the access points 604-610, the access point may obtain information related to the workstation as described with reference to FIG. 5 and provide this information to the proximity server 630. Alternatively, the address of the proximity server 630 may be provided to the wireless station during, for example, the association process and the wireless station may provide the proximity server with the information directly.

To receive information from the proximity server 630 identifying proximate wireless stations, a wireless station (e.g., wireless station 620) may be adapted to transmit a proximity request 640 to the proximity server 630. In instances where the address of the proximity server 630 is known to the wireless station 620, the wireless station 620 may transmit the proximity request 640 directly to the proximity server 630 via the access point 608. In instances where the wireless station 620 is unaware of the proximity server 630, the wireless station 620 may transmit the proximity request 640 for receipt by the access point 608. The access point 608, knowing the address of the proximity server 630, then may forward the proximity request 640 to the proximity server 630.

The proximity request 640 may include various information useful to the proximity server 630 in identifying proximate stations and providing their relevant information. The information in the proximity request 640 may include, for example, information associated with the wireless station 620 such as its MAC address, one or more user IDs, a BSSID, position coordinates provided by the GPS receiver 218 (FIG. 2), etc. The information in the proximity request 640, in one embodiment, may also include a desired proximity definition, such as a maximum proximity radius, a limitation to a same room, BSS, set of BSSs, etc.

Using the information of the proximity request 640 and the proximity database 632, the proximity server 630 may identify proximate stations using a default proximity definition or a proximity definition provided by the wireless device 620.

After identifying proximate stations, the proximity server 630 may identify information in the proximity database 632 corresponding to the identified proximate stations and provide some or all of this information to the wireless station 620 as a proximity listing 642. The proximity identification module 208 (FIG. 2) of the wireless station 620 may process the information of the proximity listing 642 as appropriate and provide relevant portions to the notification module 210 (FIG. 2) for use in notifying the user of the wireless station 620 of nearby wireless station users.

Figure 7:
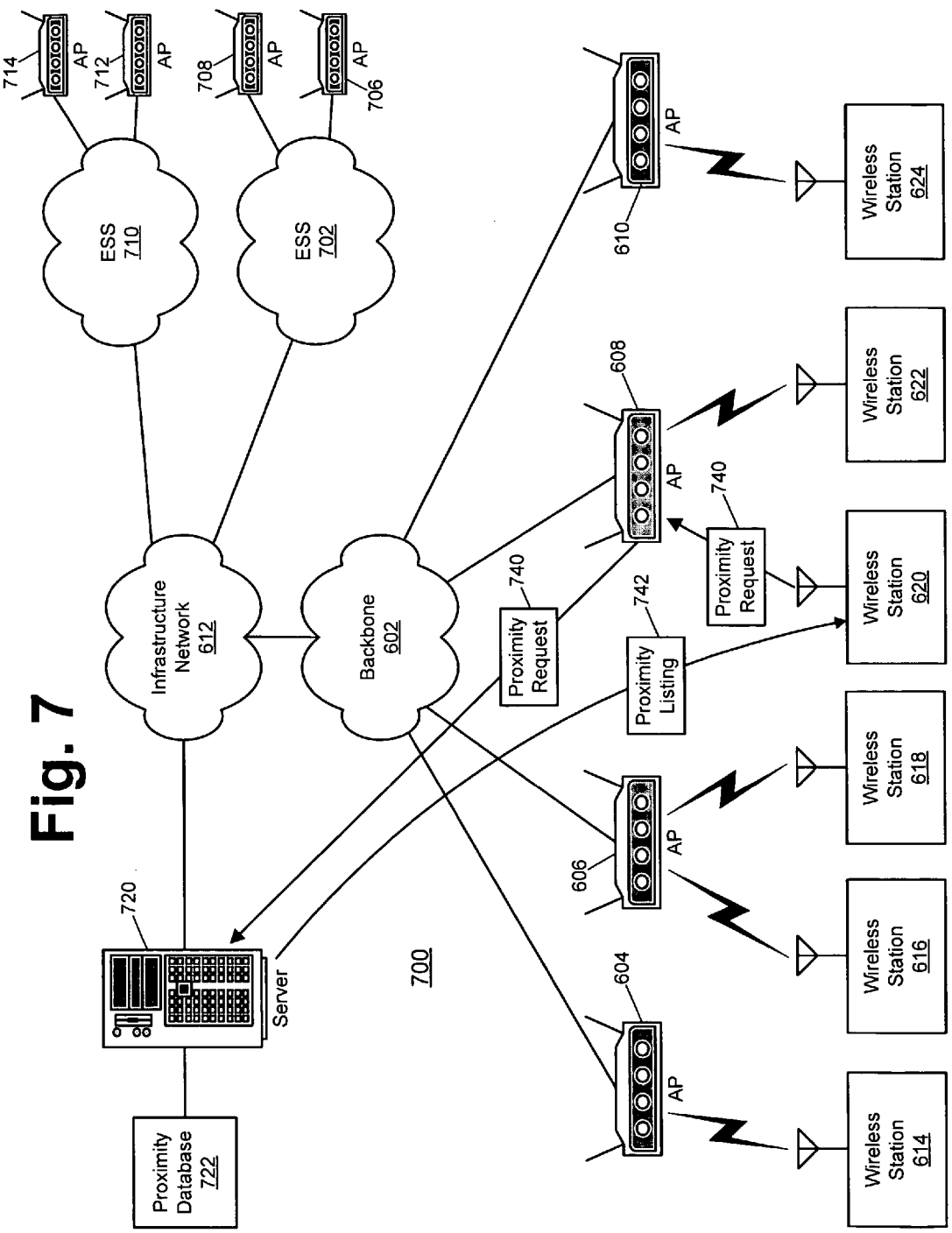
FIG. 7 is a schematic diagram illustrating an exemplary technique for identifying proximate wireless stations using proximity information maintained by a proximity server associated with an infrastructure network in accordance with at least one embodiment of the present invention.

Referring now to FIG. 7, an exemplary system 700 and technique for providing proximity information for multiple ESSs are illustrated in accordance with at least one embodiment of the present invention. System 700 includes the backbone network 602 connecting a plurality of access points 604-610 to form an ESS. The backbone network 602 is further connected to the infrastructure network 612 (e.g., the Internet) to provide network connectivity between wireless stations 614-624 and the infrastructure network 612. The infrastructure network 612 is further connected to one or more other ESSs, such as ESS 702 having access points 706, 708 and ESS 710 having access points 712, 714.

System 600 of FIG. 6 depicts a system whereby proximity information may be provided to a wireless station in an ESS by a proximity server 630 that is associated with the ESS. In certain instances, it may be advantageous to maintain a proximity server 720 capable of providing proximity information for a plurality of ESSs. For example, as noted above, multiple ESSs may be present in a building. In this case, a useful proximity definition may span multiple ESSs. Accordingly, the proximity station 720 may be adapted to maintain a proximity database 722 (analogous to proximity database 632, FIG. 6) for the wireless stations associated with multiple ESSs. The station-related information populating the proximity database 722 may be provided by, for example, the access points 604-610, 706, 708, 712 and 714 when a wireless station associates with one of the access points. Examples of information maintained in the proximity database 722 are discussed with reference to FIGS. 8, 9 and 10A-10D.

To obtain proximity information, the wireless station 620 can transmit a proximity request 740 (analogous to proximity request 640, FIG. 6) to the proximity server 720. The proximity request 740 may include a proximity definition that provides, for example, a definition of proximity that spans multiple ESSs. In response to the proximity request 740, the proximity server 722 may identify proximate wireless stations using proximity database 722 and provide information relevant to identified proximate wireless stations as proximity listing 742 (analogous to proximity listing 642, FIG. 6) for use by the wireless device 620.

Referring now to FIGS. 8, 9 and 10A-10D, examples of information maintained in proximity databases 632 (FIG. 6) or proximity database 722 (FIG. 7) are illustrated in accordance with at least one embodiment of the present invention.

Figure 8:
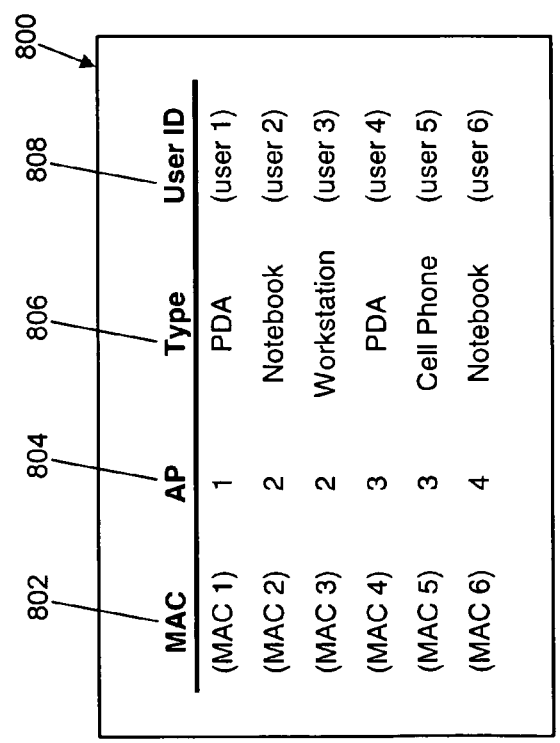

FIG. 8 illustrates an exemplary table 800 whereby information related to wireless stations (e.g., stations 614-624, FIG. 6) of an ESS may is stored by, for example, MAC address of the wireless stations (column 802), MAC address of the access point associated with the corresponding wireless station (column 804), the device type (column 806), and one or more user IDs associated with the corresponding work station (column 808).

As noted above, proximity may be limited to a BSS or a group of adjacent BSSs. Under this proximity definition, the proximity server 630/720 may identify a wireless stations proximate to a certain wireless station by identifying entries in the table 800 having an AP MAC address (or BSSID) common to the certain wireless station. To illustrate, to identify stations proximate to the wireless station having MAC address MAC 4, the proximity server 630/720 can analyze the table 800 to identify other wireless stations associated with the same access point identified by MAC address AP MAC 3. In the illustrated example, the proximate wireless station would include the station having MAC address MAC 5. The proximity server 630/72 then may select information associated with the identified proximate stations, such as the device type (column 806) and the user ID(s) (column 808).

Figure 9:
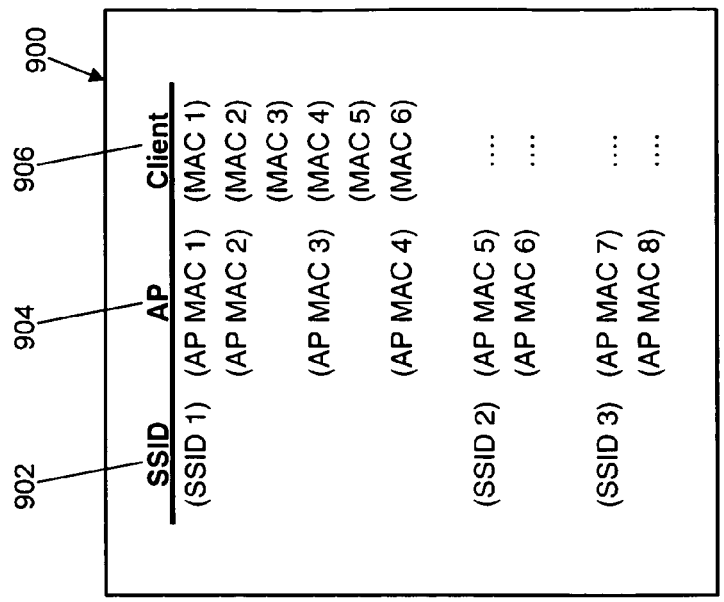
FIGS. 8, 9 and 10A-10D are block diagrams illustrating various tables of proximity information that may be maintained by a proximity server in accordance with at least one embodiment of the present invention.

In certain instances, proximity may be defined as wireless stations within the same ESS as a certain wireless device. Accordingly, FIG. 9 illustrates an exemplary table 900 organized by ESS (column 902) and then classified by access point (column) 904 and subclassified by wireless station (column 906). Using table 900, the proximity server 630/720 may identify wireless stations in a same BSS or, alternatively, in the same ESS for proximity identification purposes.

Figure 10B:
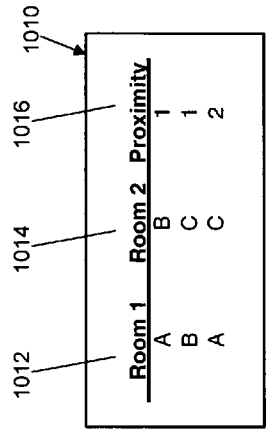
Figure 10C:
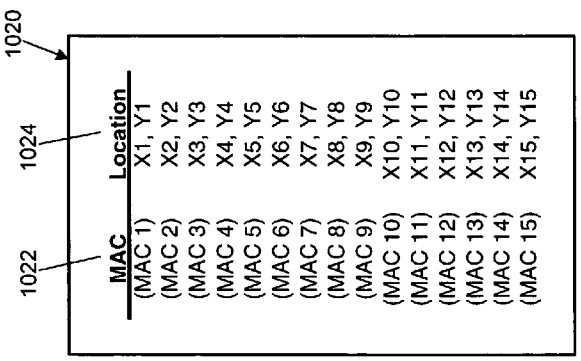
Figure 10A:
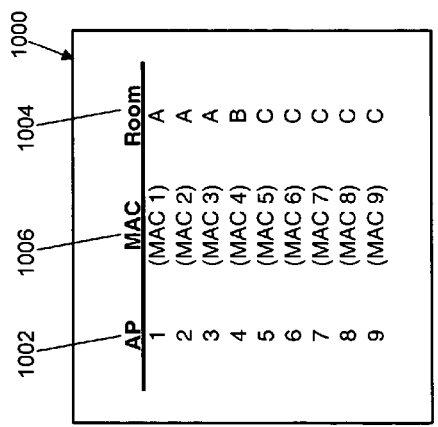
Figure 10D:
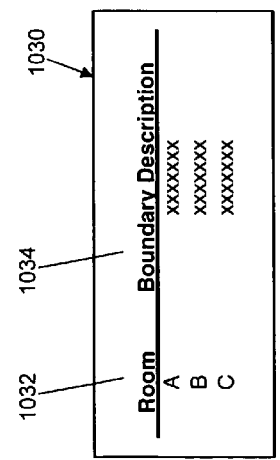

FIGS. 10A and 10B illustrate exemplary tables 1000 and 1010, respectively, that may be used by the proximity server 630/720 to identify proximate workstations when proximity is based at least in part on the relation of wireless stations to the topography of an area or the room boundaries of a building. Table 1000 of FIG. 10A illustrates a table whereby access points (columns 1002) are organized based on the room (column 1006) in which the access points are located. Table 1000 may include additional information related to the access points, such as their MAC addresses (column 1006), their position coordinates (not shown), etc. In instances where proximity is limited to the same room, enclosure or area as a certain wireless station, the proximity server 630/720 may use table 1000 to identify access points located in the same room and consequently identify wireless stations in the same room based on their association with an access point in that room.

In other instances, proximity may be limited to adjacent rooms. FIG. 10B illustrates an exemplary table 1010 that may be used by the proximity server 630/720 to identify adjacent rooms. The table 1010 may include, for example, columns 1012 and 1014 listing possible pairings of rooms and column 1016 listing a proximity value (column 1016) used to identify the degree of proximity between the pair of rooms. For example, referring to FIG. 1, room A is adjacent to room B and room B is adjacent to room C, so the pairings (room A, room B) and (room B, room C) may be assigned a proximity value of 1 to identify them as immediately adjacent. However, room A and room C are only connected via room B, so the pairing (room A, room C) may be assigned a proximity value of 2 to identify that they are indirectly connected by a third room (room B).

Rather than identifying wireless stations as being located in a certain room based on their association with a particular access point, position coordinates of the wireless stations may be used to identify their location within a building and, therefore, their proximity to a certain wireless device. To illustrate, exemplary table 1020 of FIG. 10C lists wireless stations by an identifier, such as a MAC address (column 1022), and the corresponding position coordinates (e.g., latitude $X_k$, longitude $Y_j$) of the wireless stations (column 1024). The position coordinates for a wireless station may be supplied by the GPS receiver 218 (FIG. 2) of the wireless station. To illustrate, the proximity identification module 208 (FIG. 2) may be adapted to transmit the position coordinates supplied by the GPS receiver to the access point or proximity server on a periodic basis or in response to a poll transmitted by the access point. In other embodiments, the position of the wireless station may be determined one or a plurality of access points using well known wireless triangulation methods.

Using table 1020, the proximity server 630/720 may identify wireless stations occurring within a certain proximity of another wireless station, where the proximity may be defined as, for example, an area occurring within a certain radius of the wireless station. If proximity is defined as, for example, the confines of a particular room or building, the proximity server 630/720 may use exemplary table 1030 of FIG. 10D to identify proximate wireless stations based on their position. In the illustrated example, table 1030 includes one or more entries having an identifier (column 1032) identifying a certain room, area or building and a boundary description (column 1034) describing the boundaries of the room, area or building using for example, the position coordinates of certain features of the boundaries (e.g., corners of a room). Accordingly, the proximity server 630/720 may identify wireless stations within a certain room, area or building by identifying those wireless stations having position coordinates that fall within the described boundary for the room/area/building.

In addition to receiving location-related information from the wireless stations and/or access points, the proximity server 630/720 could be adapted to obtain location-related information by performing an Internet Protocol (IP) traceroute. The resulting traceroute information typically provides information about the networks between the wireless station and the proximity server (or other Internet host). The traceroute path provides value in two ways. First, it can provide an indication of relative degree of "closeness." If two users are connected to the same service provider, but not on the same local subnet, they might share a common router on the path back to the central server. An example might be two users in different terminals at an airport equipped with a wireless LAN infrastructure. A common network router in a traceroute path does not guarantee physical proximity, but there frequently is a correlation due to the way networks are deployed and the way blocks of IP addresses are often assigned. The proximity server 630/720 may report the possible proximity back to both users. The second value of the traceroute function is to prevent "false positive" proximity indications due to the common use of network address translation (NAT) in wireless access areas. Where low-cost wireless routers are in use, there is a very high probability that a wireless user will be issued an IP address of the form 192.168.0.X. This private address space provides no location information. However, the traceroute can identify the next router in the path and identify a public IP address that the router is connecting to the Internet with and, therefore, additional location information can be derived. Furthermore, third party services are available that provide location information for most IP addresses on the Internet.

Referring now to FIG. 11, 12A-12C and 13A-13B, an exemplary automatic discovery technique for identifying proximate wireless stations is illustrated in accordance with at least one embodiment of the present invention. Rather than relying on proximity information from a proximity server or an access point, the proximity identification module 208 (FIG. 2) of a wireless station may be adapted to identify proximate wireless stations directly by monitoring frames transmitted by wireless stations within a transmission/reception area of the wireless station. In this instance, the proximity may be defined, for example, as those wireless stations within transmission/reception range.

Figure 11:
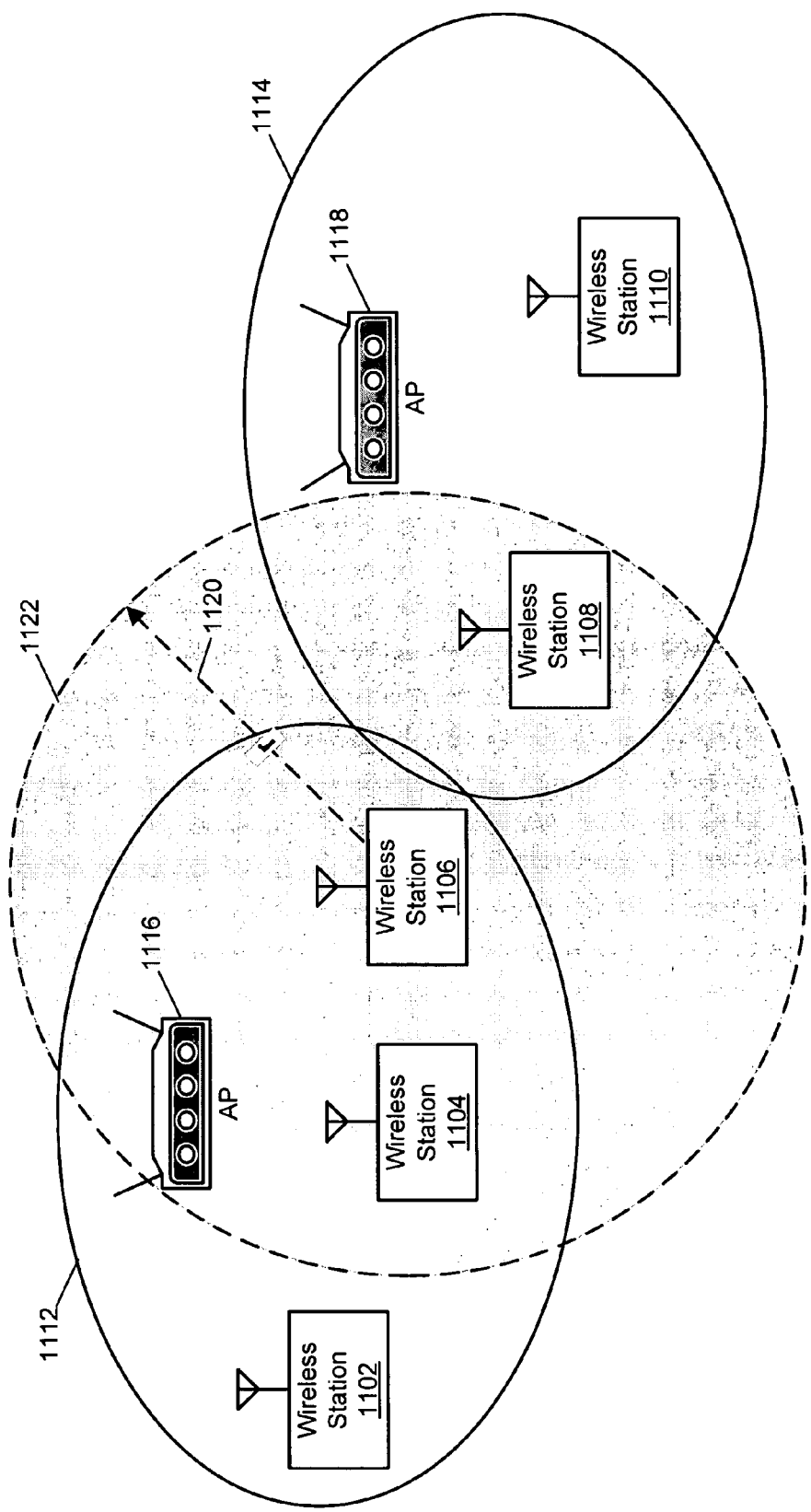

To illustrate with reference to FIG. 11, a plurality of wireless devices 1102-1110 may be located within one of coverage areas 1112 and 114 of access points 1116 and 1118, respectively. By monitoring frames transmitted by or to wireless stations within a transmission/reception range 1120 (defining transmission/reception area 1122), the wireless station 1106 may identify proximate stations within its transmission/reception range, i.e., wireless stations 1104, 1108, using the automatic discovery technique described below.

As provided by IEEE 802.11 and related standards, frames typically contain several address fields inside the MAC header, depending on their type (control, data, or management). The first address field, denoted herein as address field A1, indicates the MAC address of the immediate receiver of the frame. The second address field, denoted herein as address field A2, contains the MAC address of the transmitter of the frame. The third address field, denoted herein as address field A3, contains either the MAC address of the ultimate source of the frame (for downlink frames), the MAC address of the ultimate destination (for uplink frames), or the BSSID (for direct link and ad hoc frames). Acknowledgement (ACK) frames typically only have address field A1. Therefore, it will be appreciated that three types of frames may exist within the transmission/reception range of a wireless station: 1) a frame intended for receipt by the wireless station (e.g., a frame having the MAC address of the wireless station as its destination address), referred to herein as a "receipt intended frame"; 2) a frame overheard by the wireless station but intended for receipt by another wireless station (e.g., a frame having a MAC address of another wireless station as its destination address), referred to herein as an "overheard frame"; and 3) a frame transmitted by the wireless station for receipt by another station (e.g., a frame having the MAC address of the certain wireless station as the source address), referred to herein as an "originating frame."

FIGS. 12A-12C illustrate various exemplary methods 1200A, 1200B and 1200C for monitoring frames transmitted within the transmission/reception range of a wireless station (e.g., wireless station 1106) to identify potential proximate stations using the address fields A1, A2 and A3 of the frames. Exemplary method 1200A describes a method for monitoring overheard frames, exemplary method 1200B describes a method for monitoring receipt intended frames and exemplary method 1200C describes a method for monitoring originating frames.

Method 1200A initiates at step 1202 wherein the wireless station 1106 overhears a frame transmitted by another station. The proximity identification module 208 (FIG. 2) may identify the frame as an overheard frame by, for example, noting that the MAC address in address field A1 does not match the MAC address of the wireless station 1106. At step 1204, the MAC address stored in address field A1 of the frame is stored in peer list 1 (PL1) maintained by the proximity identification module 208. At step 1206, the MAC address stored in address field A2 is stored in a peer list 2 (PL2) maintained by proximity identification module 208. Method 1200B initiates at step 1208 when a the wireless station 1106 receives a receipt intended frame, i.e., a frame having the wireless station 1106 as the ultimate destination. The proximity identification module 208 may identify the frame as such by noting that the MAC address in address field A3 matches the MAC address of the wireless station 1106. At step 1210, the MAC address in address field A3 is stored in a peer list 3 (PL3) maintained by proximity identification module 208. Method 1200C initiates at step 1212 when the wireless station 1106 transmits a frame. At step 1214, the proximity notification module 208 stores the MAC address of address field A3 of the transmitted frame in PL3.

In methods 1200A-1200C, filtering of frames that contain a BSSID, multicast address or broadcast address preferably is performed to prevent the storage of such in PL1, PL2 or PL3. Furthermore, PL1, PL2 and PL3 preferably are aged or periodically refreshed to maintain the accuracy of the lists. PL1 and PL2 may be pre-populated when stations periodically transmit a null frame at a low PHY rate; a station's own MAC address stored in address fields A1 and A2 (i.e. Null-to-self). The peer lists may also be pre-populated when other stations join and authentication or association request/response frames are received. Address information from probe request/response frames preferably is not added to the peer lists because such frames do not indicate the presence of a station on that channel.

As a result of methods 1200A-1200C, PL1, PL2 and PL3 are populated with the MAC addresses of wireless stations overheard by wireless station 1106 or in communication with the wireless station. To identify wireless stations that potentially are within transmission/reception range of the wireless station 1106, the proximity identification module 208 may implement exemplary method 1300A of FIG. 13A and method 1300B of FIG. 13B.

Method 1300A initiates at step 1302 wherein PL1 and PL3 are compared to identify MAC addresses that occur in both PL1 and PL3. A MAC address stored in PL3 implies that wireless station 1106 is either receiving data from that MAC address or it is sending data to that MAC address, so the wireless station having the MAC address might be a potential peer. The occurrence of the same MAC address in PL1 and PL3 indicates that wireless station 1106 overheard a frame being transmitted to another station that is not in communication with the wireless station 1106, which in turn implies that that other station is nearby and potentially inside the same BSS. This is, however, no guarantee that the two stations are within transmission/reception range because no frame was received from that address. Accordingly, at step 1304, the proximity identification module 208 may transmit a test frame directly (i.e., bypassing the access point) to the wireless station having the MAC address occurring in both PL1 and PL3. The test frame may include, for example, a null frame or randomly generated frame. At step 1306, the proximity identification module 208 waits for an ACK frame from the other wireless station in response to the test frame. If no ACK frame is received, the other wireless station is marked as out of transmission/reception range of the wireless station 1106 at step 1308. If an ACK frame is received, the proximity identification module 208 at step 1310 may mark the other wireless station as within the transmission/reception range of the wireless station 1106 and therefore proximate to the station 1106 if proximity is defined as such.

If no ACK frame received, a direct link may still be set up even though direct communications may not be possible. The direct link communications may be relayed by the access point but it may still be possible to use a subset of the extra capabilities in this context. To illustrate, two stations may be in the same BSS but outside of direct link range. In this case, they typically need the access point to relay their traffic because direct transmission is not possible. However, it may be useful to setup an "indirect" direct link in this case by allowing the stations to use a subset of the performance enhancements provided by a direct link. These performance enhancements may include those features which are transparently forwarded by the access point, such as compression, concatenation, encryption, etc.

In this situation, stations which are not within transmission/reception range of each other but which are associated with the same access point may trigger a direct link setup procedure with access point. Similarly, if two stations are engaged in a direct link and they move out of range, the direct link may be logically maintained by routing traffic via the AP and reducing the capability set to match the capabilities of the AP. An indirect direct link (e.g., a long-distance direct link or extended direct link) may require that an additional capability be added to the IDLP signaling. If the long range capability is present in both peer stations, this may imply that the direct link is not ended when a direct transmission fails, but only when the idle timeout passes or when a teardown occurs.

Instead of using a test frame, the first data frame transmitted over the direct link formed between the wireless station 1106 and the other station (as described below) may also function as the test frame. When an ACK frame in response to the first data frame exceeds the retry limit, the direct link may be discarded and the other wireless station marked as out of transmission/reception range. This alternate test process, however, may introduce duplicates at the receiving station so the use of a separate test frame is preferable. Note that the Direct Link typically must be established on a logical level before the test frame is used to test the link.

Method 1300B initiates at step 1312 wherein PL2 and PL3 are compared to identify MAC addresses that occur in both PL2 and PL3. The same MAC address showing up in both PL2 and PL3 implies that wireless station 1106 overheard a frame from another station with which it is currently exchanging traffic. The occurrence of the MAC address of the other wireless station in PL2 indicates that a direct radio connection exists and, therefore, the other wireless station is proximate to wireless station 1106 under a proximity defined by the reception radius 1120 (FIG. 11). Accordingly, due to the high probability that the other wireless station is within transmission/reception range of the wireless station 1106, the proximity identification module 208 may identify the other wireless station as within transmission/reception range and proximate at step 1314 without transmitting a test frame.

In certain instances, the technique described with reference to FIGS. 1200A-1300B may be simplified by collapsing PL1 and PL2 into a Nearby Node List (NNL) where NNL=PL1∪PL2. PL3 then becomes a Peer List (PL) that contains the addresses of peer stations. When the same MAC address occurs in both PL and NNL, the station having the MAC address may be marked as a potential proximate station, but this procedure should include a directed test frame to assess the quality of the radio link between the wireless station 1106 and the other station. The technique may be simplified further by identifying any station having a MAC address in the NNL as a potentially proximate station. The actual proximity of the potentially proximate station then may be verified by, for example, transmitting a test frame to the potentially proximate station.

Referring now to FIG. 14, exemplary techniques for determining one or more user IDs associated with an identified proximate wireless station are illustrated in accordance with at least one embodiment of the present invention. For the following, assume a wireless station 1402 has identified a wireless station 1404 as proximate under a default proximity definition or a proximity definition defined by a user of the wireless station 1404. Prior to notifying the user of the wireless station 1402 of the proximate wireless station 1404, the proximity identification module 208 or notification module 210 (FIG. 2) may attempt to obtain one or more user IDs 1406 associated with the user of the wireless station 1404.

In one embodiment, the wireless station 1404 may directly supply the desired user ID information 1406 to the wireless device 1402 using, for example, a frame transmitted over a wireless direct link formed between the stations 1402 and 1404 (the formation of direct links are discussed in detail below) by transmitting the user ID information 1406 to the wireless device 1402 as a broadcast or multicast frame. Alternatively, user ID information 1406 may be supplied to an access point 1408 associated with the wireless station 1404 or a proximity server 1410 (analogous to proximity server 630/720) responsible for providing proximity information to wireless station 1402. The wireless device 1402, in turn, may request the information from the access point 1408 or the proximity server 1410 using one or more techniques described above.

Figure 15:
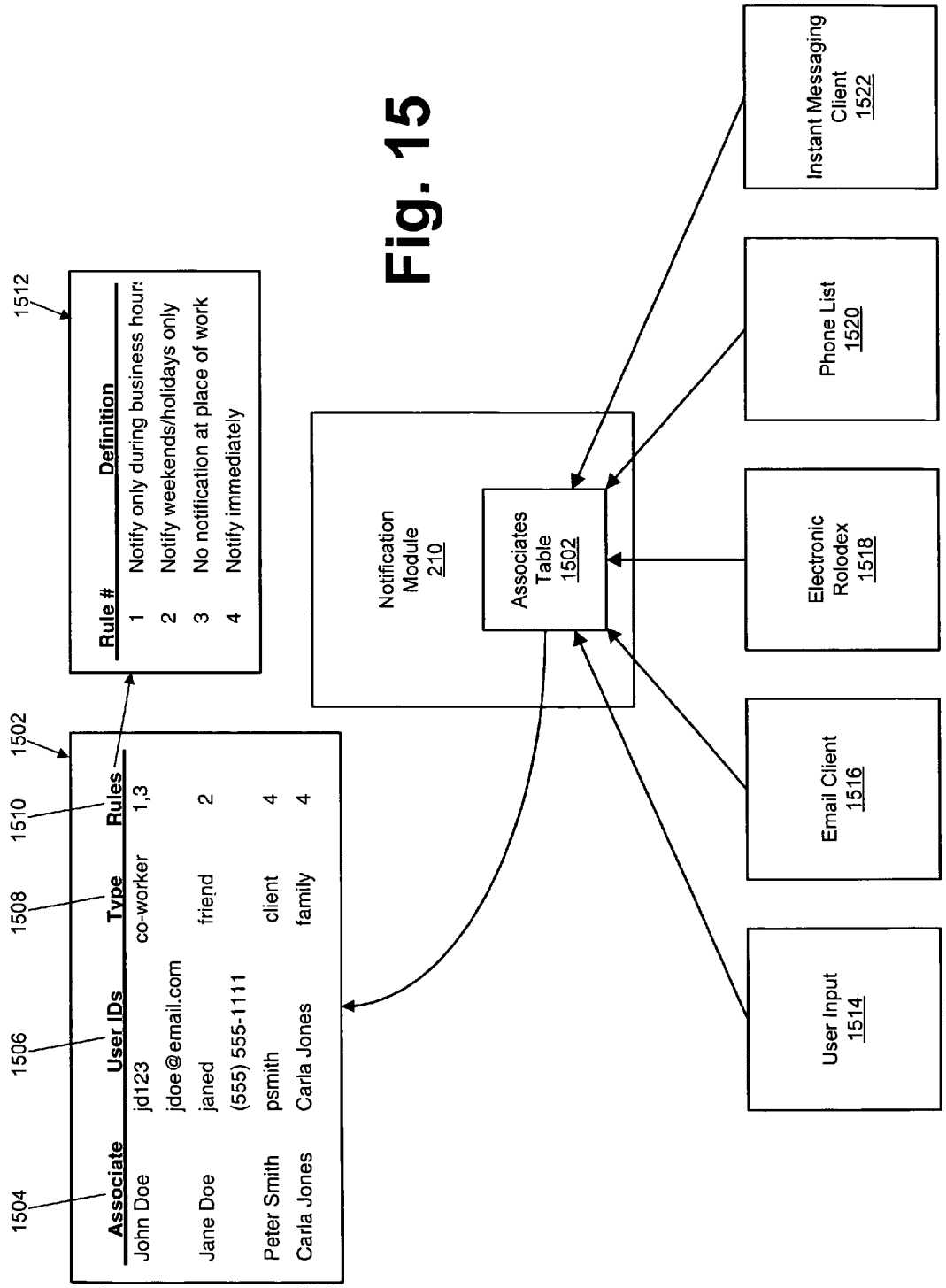
FIG. 15 is a schematic diagram illustrating an exemplary table of information related to associates of a user of a wireless station in accordance with at least one embodiment of the present invention.
Figure 16:
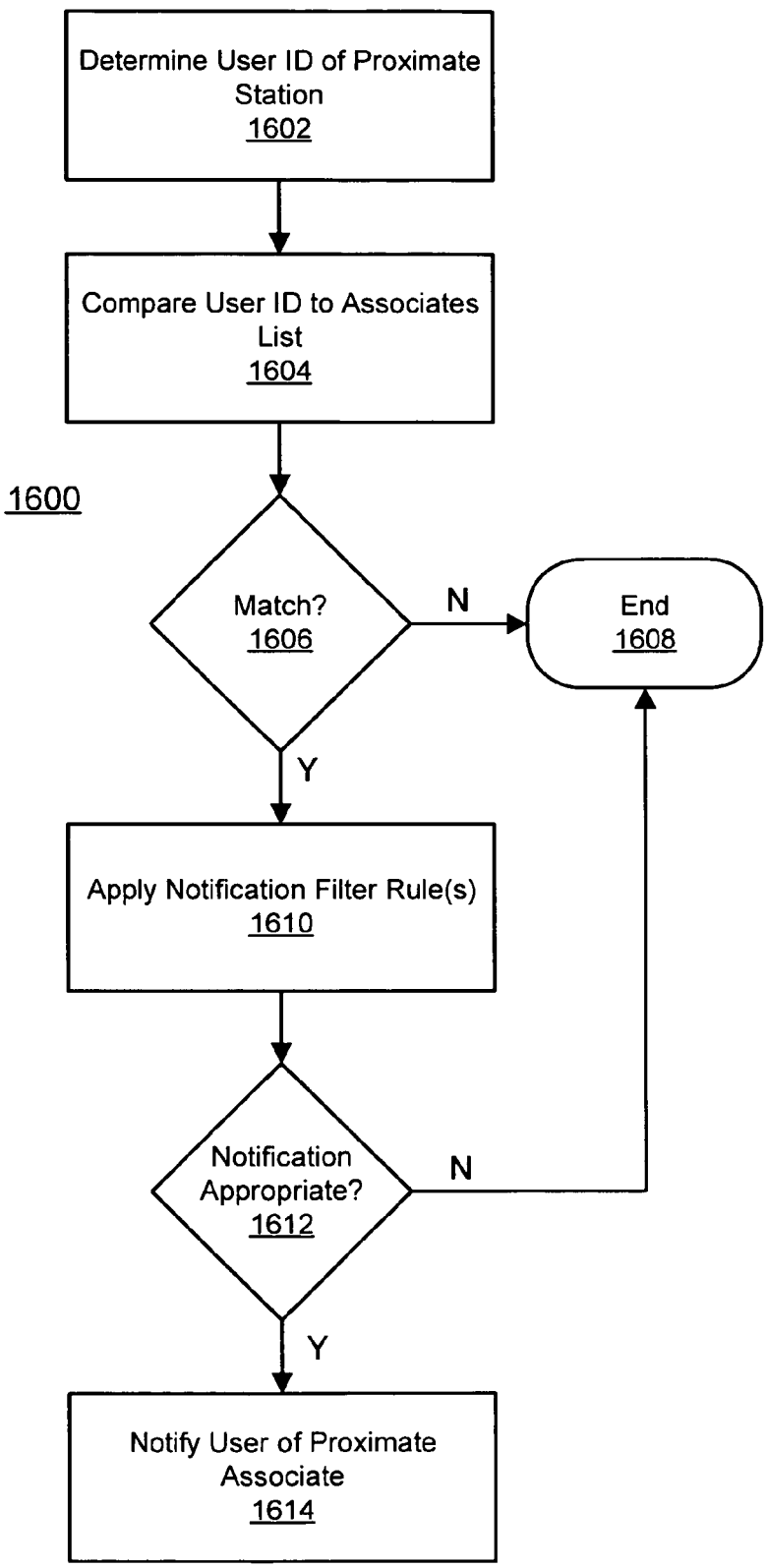
FIG. 16 is a flow diagram illustrating an exemplary technique for notifying a wireless station user of one or more proximate wireless station users using the table of FIG. 15 in accordance with at least one embodiment of the present invention.

Referring now to FIGS. 15 and 16, an exemplary technique for filtering proximate station users for notification purposes is illustrated in accordance with at least one embodiment of the present invention. As noted above, the notification module 210 of a wireless station may perform a filtering process to determine whether the user of the wireless station should be notified of a proximate user. In at least one embodiment, this filtering process includes maintaining an associates table 1502 of user IDs of associates of the user of the wireless station. The associates table 1502 may include a variety of information, such as, for example, a name of the associate (column 1504), user ID(s) of the associate (column 1506), an associate type (column 1508), notification filter rules to be applied to the associated (column 510, rules table 1512), etc.

Information populating the associates table 1502 may be derived from any of a variety of sources. For example, the notification module 210 may be adapted to facilitate the input of associate information directly by the user (user input 1514). Associate information also may be obtained from other information sources, such as the email list of an email client 1516, (e.g., the contacts list information from a Microsoft® Outlook® software program), information from an electronic rolodex 1518, an electronic phone list 1520 maintained in, for example, a cell phone or PDA, or user information from a instant messaging client 1522.

FIG. 16 illustrates an exemplary method 1600 for filtered notification of proximate users using the associates table 1502 of FIG. 15. The method initiates at step 1602 wherein the user IDs associated with proximate stations are determined as described above. At step 1604, the user ID obtained from a proximate station is compared with the user IDs (column 1506) of the associates table 1502. In the event that a user ID from a proximate station does not substantially match a user ID in the associates table 1502 (step 1606), the consideration of the user ID for notification purposes may terminate at step 1608 and the next user ID, if any, may be considered for notification purposes.

In the event that the user ID from a proximate station substantially matches a user ID in the associates table 1502, the user ID from the proximate station may be identified as belonging to an associate. Accordingly, at step 1610 the notification module 210 may apply one or more notification filter rules in determining the manner in which the user is notified. The notification rules applicable to a particular associate may be determined from the associates table 1502 or other filter rule source or a default set of notification filter rules may be applied.

The notification filter rules preferably provide guidelines for proximity notification under various conditions. For example, the user may desire to be notified of proximate business associates only during normal business hours (e.g., 9 AM-5 PM, Monday-Friday). Accordingly, the user may set a rule whereby the notification module 210 is prevented from notifying the user of a proximate business associate during non-business hours. In another example, it may be appropriate to prevent notification of proximate associates in circumstances where their proximity to the user may already be assumed. For example, the user may set a rule whereby notification of proximate co-workers is deactivated within the user's place of work. Other filter rules may be utilized by those skilled in the art using the teachings provided herein without departing from the spirit or the scope of the present invention.

In at least one embodiment, a user may desire notification of proximate wireless users regardless of any association between the user and the proximate users. In this case, after determining the user IDs of a proximate station at step 1602, the notification module 210 may be adapted to automatically notify the user without comparing the user ID to the associates table 1502 or applying notification filter rules.

If notification of a proximate associate is appropriate (step 1612) after applying the relevant notification filter rules, the notification module 210 may notify the user of the wireless station that the associate is nearby at step 1614. Various methods may be used to notify the user. For example, the notification module 210 may prompt the display of a window on a display screen of the user's wireless station that contains text or other graphical representations that notify the user of the proximate associate and provide information about the proximate user. Notification also may be performed by providing speech output via a speaker of the wireless station, the speech output informing the user of the proximate user and providing information about the proximate user. Information about the proximate user may include, for example, the name of the proximate user, the user ID, a telephone number or email address associated with the proximate user, a position (e.g., position coordinates, location within a particular room/area, etc.) of the proximate wireless station, and the like.

In at least one embodiment, the notification also presents the user with the option of initiating a wireless direct link with the proximate station if the proximate station is within transmission/reception distance of the user's station. Alternatively, the user's wireless station could be configured to automatically initiate a wireless direct link with a proximate station. The initiation and establishment of a wireless direct link is discussed in detail below.

Figure 17:
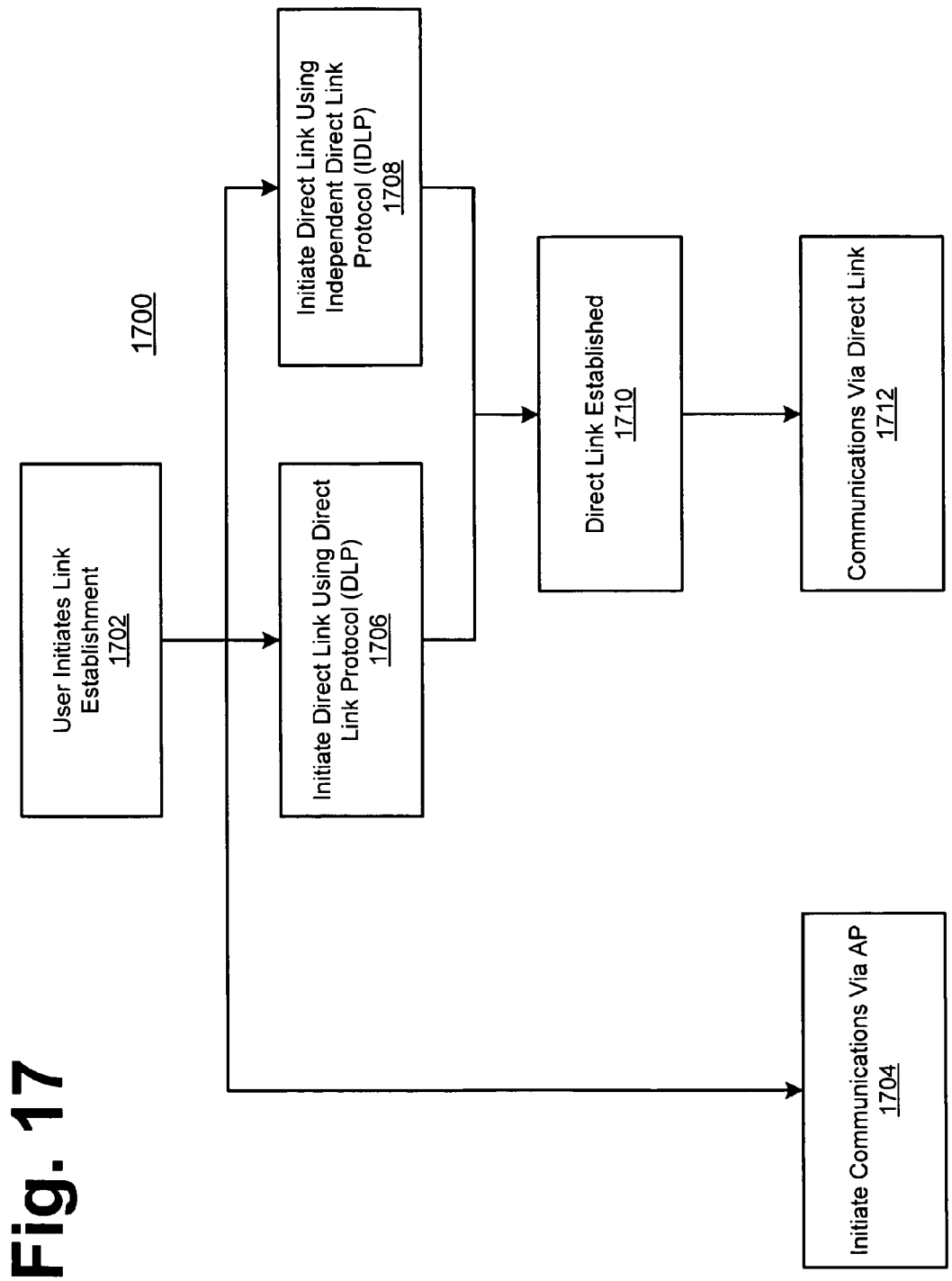
FIG. 17 is a flow diagram illustrating exemplary techniques for communicating with a proximate wireless station in accordance with at least one embodiment of the present invention.

Referring now to FIG. 17, an exemplary process 1700 for selecting a communication method between proximate wireless stations is illustrated in accordance with at least one embodiment of the present invention. After receiving an indication from a user of a wireless station that communications with a proximate station are desired (step 1702), the link module 212 (FIG. 2) of the wireless station may attempt to establish communications with the proximate station either via conventional means or via a direct link. In the event that the proximate station is out of transmission/reception range or the proximate station is incapable of or prevented from forming a direct link, at step 1704 the link module 212 may establish communications with the proximate station in a conventional manner whereby frames are transmitted to the proximate station, and vice versa, via the access points, backbone network, and/or infrastructure network to which the wireless station and proximate station are connected.

Otherwise, if a wireless direct link is feasible between the proximate stations, a direct link may be initiated by the wireless station using any of a variety of direct link establishment techniques. For example, in instances wherein the access point is enabled to facilitate the establishment of a wireless direct link between stations, the wireless station may initiate a direct link at step 1706 using the Direct Link Protocol (DLP) technique described in U.S. Patent Application No. 60/388,569 filed Jun. 12, 2002, the entirety of which is hereby incorporated by reference.

Where the access point is prevented from facilitating a direct link between the proximate stations or where the proximate stations may be capable of a PHY rate that is not supported by the access point, the wireless station may initiate a direct link at step 1708 using an Independent Direct Link Protocol (IDLP) technique as described below with reference to FIGS. 18 and 19.

Direct links offer a number of advantages over conventional communications between stations using an access point as an intermediary. For one, direct links typically are more efficient as the access point is eliminated as an intermediary hop. Furthermore, the bandwidth allocated to a particular wireless station may be limited due to the volume of traffic handled by the access point or the access point may not support a PHY rate of which the proximate stations are capable. To illustrate, the access point may support only IEEE 802.11b with a maximum rate of 11 megabits per second (Mbps), whereas the proximate stations may support IEEE 802.11g with a maximum rate of 54 Mbps. With a direct link, however, active involvement by the access point is removed from the process and a higher data rate therefore may be established between the two proximate stations.

After a direct link has been established between the proximate stations at step 1710, the users of the proximate stations may initiate communications via the direct link at step 1712. The communications carried over the direct link may serve a variety of purposes. When the users of the proximate stations are associates, the communications may include, for example, instant messages or direct emails transmitted between the users for the purpose of setting up a time and or place for the users to meet face-to-face. The users may establish a videoconference over the direct link to allow for interactive audio and video communications. Alternatively, the direct link may be established for establishing a relationship between the proximate users. For example, a wireless station may include a workstation operated by a business, where the workstation is adapted to transmit one or more advertisements, coupon offers or other business communications to the users of proximate stations over direct links established with the proximate stations. The users may consider the business communications in view of the proximity of the business and may choose to visit the business.

Figure 18:
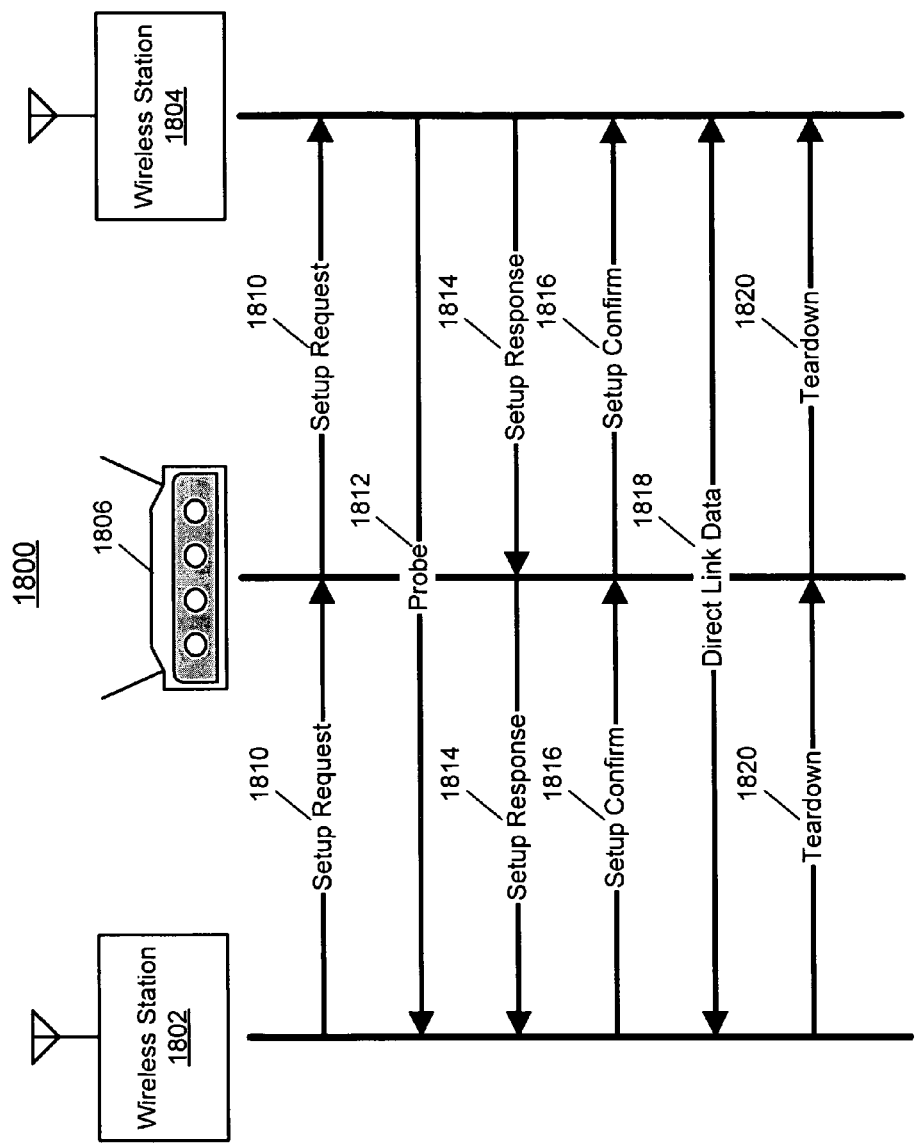
FIG. 18 is a schematic diagram illustrating an independent link protocol (IDLP) technique for establishing a wireless direct link between proximate wireless stations in accordance with at least one embodiment of the present invention.
Figure 19:
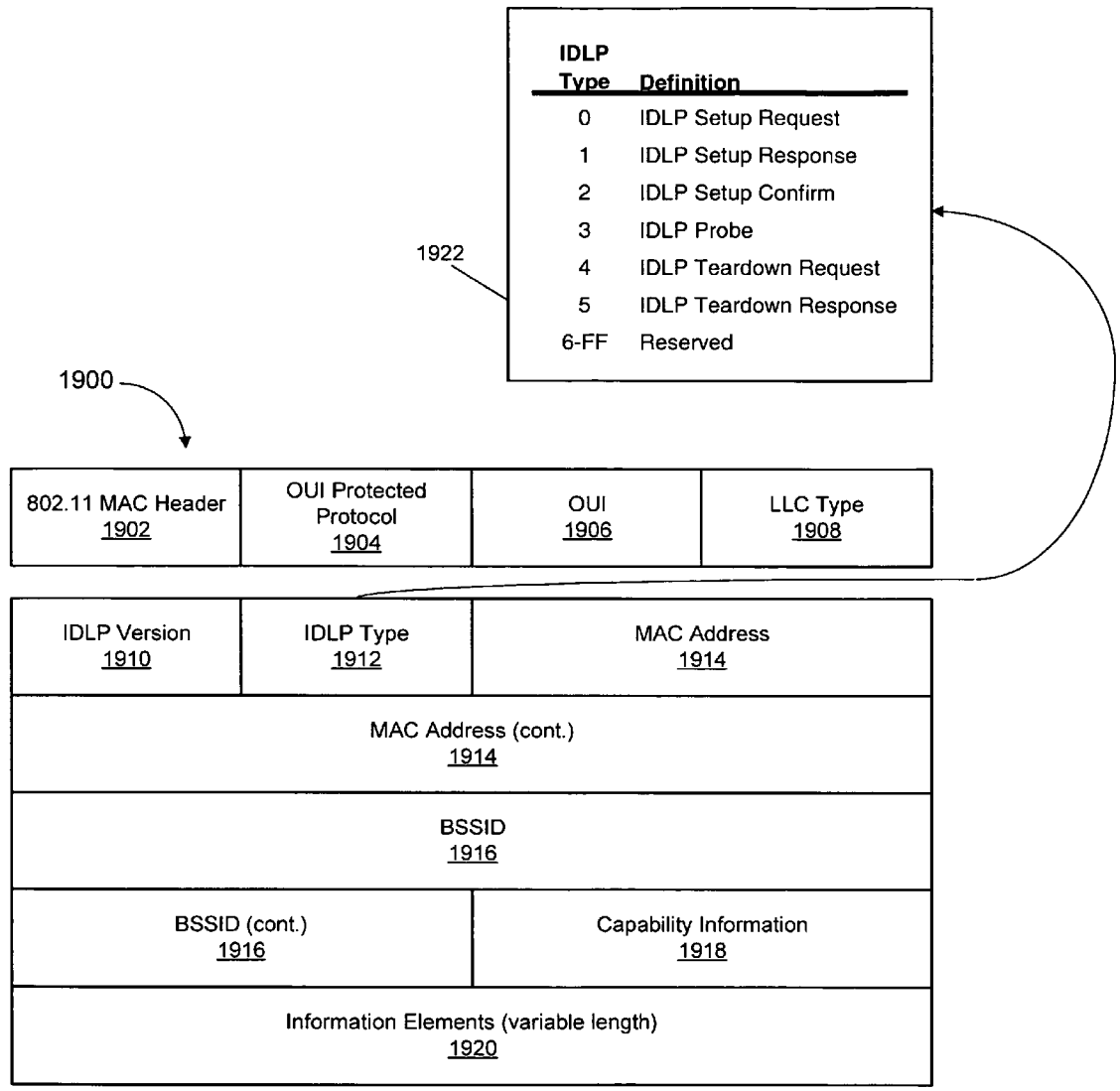
FIG. 19 is a schematic diagram illustrating an exemplary IDLP frame used by the technique of FIG. 18 in accordance with at least one embodiment of the present invention.

Referring now to FIGS. 18 and 19, the IDLP technique for establishing a wireless direct link between proximate wireless stations is illustrated in accordance with at least one embodiment of the present invention. As noted above, U.S. Patent Application No. 60/388,569 discloses a DLP technique for use with IEEE 802.11e that uses MAC management frames to establish a direct link between stations. The DLP technique provides for the transmission of a protocol message from a station to an access point. The access point, in turn, sends the protocol message to the proximate station. The proximate station responds with a message to the access point, which then sends a message to the initiating station to establish a direct link. Because the messages are in the form of MAC management frames, the access point interprets these messages and forms new messages for the receiving station as a result.

In certain instances, however, the access point may not be enabled to process MAC management frames in accordance with the DLP technique or the access point may be configured to prevent the establishment of a direct link between proximate stations by analyzing incoming frames to eliminate those MAC management frames that may be used to initiate a direct link. Accordingly, in at least one embodiment, the IDLP technique described herein overcomes the limitations of the access point by initiating and establishing a direct link without active cooperation by the access point. The access point's active cooperation may be bypassed by encapsulating the IDLP signaling messages at the logical link control (LLC) level instead of the MAC level. The LLC encapsulated signaling messages may be transmitted as MAC data frames which typically are transparently forwarded by the access point regardless of the LLC type. As a result, both the setup and capabilities (e.g., PHY rate) become independent of the limitations of the access point. To illustrate, two IDLP-enabled wireless stations may negotiate and setup a direct link implementing, for example, IEEE 802.11g orthogonal frequency division multiplexing (OFDM) modulations even though the access point is only capable of supporting Barker and complementary code keying (CCK) modulations as set forth in IEEE 802.11b.

To illustrate an exemplary operation of a IDLP direct link setup, FIG. 18 depicts proximate wireless stations 1802 and 1804 associated with access point 1806. After determining that a direct link is possible between the wireless devices 1802, 1804 (e.g., they are within transmission/reception range of each other), the wireless station 1802 may transmit a setup request frame 1810 to the access point 1806. To avoid a situation where an IDLP setup procedure is started by both stations 1802 and 1804, the stations 1802 and 1804 may adhere to a convention that only the station with the lowest MAC address shall start an IDLP setup procedure. The setup request frame 1810 preferably includes a MAC data frame having the MAC address of the wireless station 1804 as the destination address. The setup request frame 1810, in at least one embodiment, further includes direct link information encapsulated at the LLC layer as discussed below with reference to IDLP frame 1900 of FIG. 19. The direct link information may include, for example, proposed link capabilities, such as proposed IEEE 802.11 characteristics (e.g., supported rates) and vendor-specific features (e.g., compression). In one embodiment, the direct link information further may include encryption key information, as discussed below.

The access point 1806 receives the setup request frame 1810 and because it appears to be a typical MAC data frame to the access point 1806, the access point 1806 sends the setup request frame 1810 to the wireless station 1804 as a unicast frame. The wireless station 1802 preferably is prevented from entering a power save mode after transmitting the setup request frame 1810.

Upon receiving the setup request frame 1810, in at least one embodiment, the wireless station 1804 transmits a IDLP probe frame 1812 directly to the wireless station 1802. The IDLP probe frame 1812 may include, for example, a random 1500-byte data frame having the MAC address of the wireless station 1802 in both address fields A1 and A2 (discussed above). Upon receipt of the IDLP probe frame 1812, the wireless station 1802 preferably is adapted to immediately send an ACK frame to the wireless station 1804 rather than processing the IDLP probe frame 1812 by the protocol stack 226 (FIG. 2) before sending an ACK frame.

If the wireless station 1804 does not receive an ACK frame from the wireless station 1802 in response to the IDLP probe frame 1812, the wireless station 1804 may transmit a IDLP teardown response to abort the direct link establishment process. Otherwise, if the ACK frame is received, the wireless station 1804 may consider the proposed capabilities presented in the setup request frame 1810. If the proposed capabilities are acceptable to the wireless station 1804, the wireless station 1804 may transmit a setup response frame 1814 to the wireless station 1802 via the access point 1806. If the setup request frame 1810 advertises multiple capabilities of the same sort (for instance a selection of supported compression algorithms), the wireless station 1804 may choose and select one of these and indicate its selection in the setup response. As with the setup request frame 1810, the setup response frame 1814 may include an IDLP frame encapsulated at the LLC layer to appear as a typical MAC data frame to the access point 1806 so that the access point 1806 forwards the setup request frame 1814 to the wireless station 1802 with minimal modification.

Upon receipt of the setup response frame 1814, the wireless station 1802 enables itself to receive frames directly from wireless station 1804 and transmits a setup confirm frame 1816 to the wireless station 1804 via access point 1806. The setup confirm frame 1816 confirms the successful negotiation of the capabilities of the direct link between the stations 1802 and 1804 and notifies the station 1804 to enter direct link mode. As with frames 1810 and 1814, the setup confirm frame 1816 may include an LLC encapsulated frame that appears as a MAC data frame to the access point 1806 so that it is forwarded with minimal processing by the access point 1806.

After setup confirm frame 1816 has been received by the wireless station 1804, a direct link is established between the wireless stations 1802, 1804 and each station therefore may transmit data frames 1818 directly to the other station without the access point 1806 acting as an intermediary.

When the direct link is to be terminated, one of the wireless stations 1802 and 1804 may transmit an IDLP teardown request frame 1820 to the other either directly via the direct link or via the access point 1806. The receipt of the IDLP teardown request frame 1820 directs the receiving wireless station to cease direct transmission of frames to the other workstation. The receiving wireless station may then transmit a teardown response frame (not shown) to the other station to acknowledge receipt of the teardown request.

FIG. 19 illustrates and exemplary LLC-encapsulated IDLP frame 1900 that may be used as the setup request frame 1810, setup response frame 1814, setup confirm frame 1816 or teardown request frame 1820. In the illustrated example, the IDLP frame 1900 is similar to a MAC data frame in that it includes a MAC header field 1902 in accordance with one or more wireless standards, an Organizationally Unique Identifier (OUI) protected protocol field 1904, an OUI field 1906, and an LLC type field 1908. The IDLP frame 1900 further includes an IDLP version field 1910, and IDLP type field 1912, a MAC address field 1914, a BSSID field 1916, a capability information field 1918 and an information elements field 1920.

The LLC type field 1908, in one embodiment, includes a value (e.g., 0x0003) identifying the frame 1900 as an IDLP frame. Accordingly, upon receipt of the frame 1900, an IDLP-enabled wireless station may note the IDLP identifier in the LLC type field 1908 and process the frame 1900 in accordance with the IDLP techniques described above. The IDLP version field 1910 contains a value indicating the IDLP version applicable to the frame 1900. The IDLP type field 1912 contains a value indicating the type of IDLP frame as shown by table 1922. The MAC address field 1914 stores the MAC address of the station transmitting the frame 1900 and the BSSID field 1916 stores the BSSID with which the transmitting station is associated.

As noted above, the setup request frame 1810, the setup response frame 1814 and setup confirm frame 1816 are used to negotiate the capabilities of the proposed direct link. Accordingly, the capability information field 1918 may include data related to the capabilities, such as PHY rate, compression types, encryption capabilities, etc. The probe frame 1812 and teardown request/response frames typically do not convey link characteristic information. These frames therefore may omit the capability information field 1918 and information elements field 1920.

Security via encryption is frequently provided in Wireless Fidelity Protected Access (WPA) or similar environments, such as IEEE 802.11i. Pairwise encryption keys established by WPA or the like may be used to secure the IDLP setup messages. The encryption key for protecting subsequent station-to-station IDLP data therefore can simply be transferred over the WPA protected link, as the entire IDLP Setup Request/Response exchange is protected by the pairwise key between the stations and the access point. In one embodiment, the information elements field 1920 may be used to transport the key material to be used on the direct link. This information preferably is provided only in the setup request frame 1810. A key material type field preceding the key material in the information elements field 1920 may be used to indicate the type and context of the key material present in the information elements field 1920. There is one simple key material type indicating that the direct link uses the same cipher suites as used on the pairwise links between a station and the access point and only key material is provided. Other types may indicate specific cipher suites to be used on the direct link. To illustrate, if TKIP is being used on pairwise links between stations and the access point in the network and both stations intend to use TKIP for the direct link as well, providing key material only suffices and the cipher suite will default to the cipher suite used between the station and the access point. However, if for example the stations wish to use the stronger AES (advanced encryption standard) algorithm for their direct link (this may not even be available on the access point), cipher suites need to be negotiated explicitly along with provision of key material.

Referring now to FIGS. 20-29, various exemplary techniques for power management in wireless stations connected via a direct link are illustrated in accordance with the present invention. The following describes techniques that permit peer stations to go to sleep, while a direct link connecting them may be temporarily suspended. The present invention provides at least three direct link power management techniques: Fast Resumption Mode (FRM) wherein the direct link is resumed automatically at a specified timing synchronization function (TSF); Slow Resumption Mode (SRM) wherein the direct link may be resumed by sending a Resume-Request via the access point; and Reverse Polling (RP), wherein one peer station of the direct link is continually awake and the other peer station uses reverse polling to start a service period.

Figure 20:
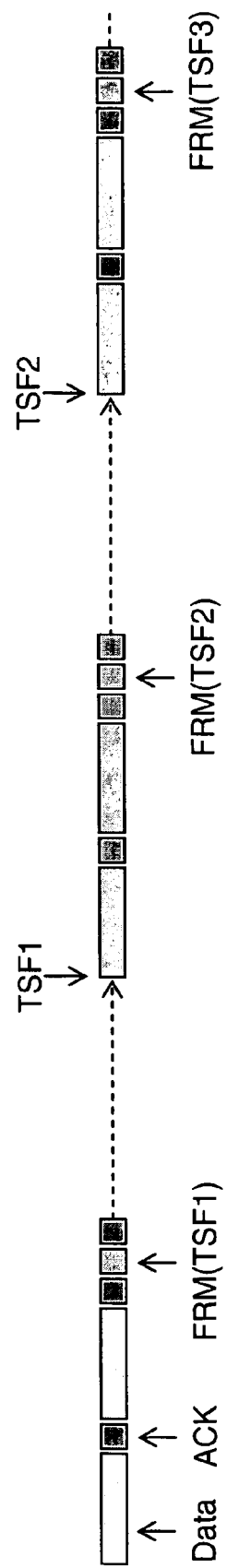
Figure 21:
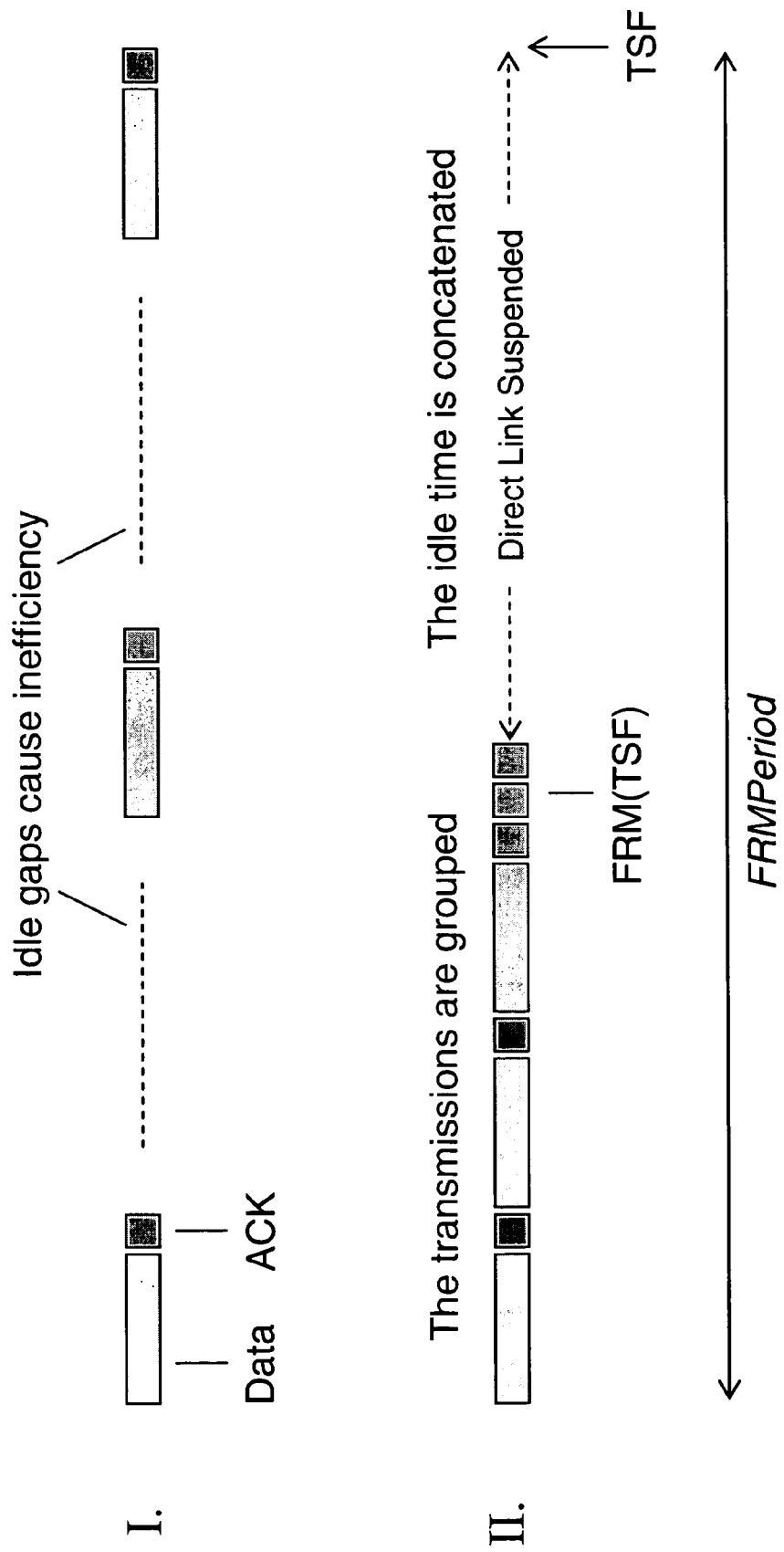

FIGS. 20 and 21 illustrate an exemplary implementation of the FRM power management process. In an FRM power save mode, a direct link may be suspended by sending an FRM frame and automatically resumed at a specified TSF timestamp. The FRM frame preferably is transmitted at a low rate, to minimize reception errors. The FRM sleep time may be dynamically adapted based on the instantaneous link load. During the FRM sleep time, both peer stations may enter a sleep state to conserve power.

Typical applications for the FRM power management process are streaming audio or video, which are inherently rate limited and will not always occupy the full link bandwidth. This also may be the case when there are multiple streams so that the direct link receives limited service time or when a flow is received from the Internet. The flow from the Internet is potentially rate limited as well, due to slower links in the Internet path.

In at least one embodiment, the FRM power management process attempts to match the awake time of both peer stations with the effective duty cycle of the peer-to-peer traffic stream. In this case, the peer stations preferably are associated with the same access point so that their TSF timers are synchronized. While the direct link is FRM suspended, the peer stations are configures to abstain from send data to the other peer node, either via the direct link or via the access point. FIG. 20 illustrates a group of frames transmitted between peer stations via a direct link whereby the direct link is suspended after each group of frames to match the effective duty cycle of the stream.

In at least one embodiment, the receipt of an FRM frame will cause the receiving station to enter a sleep state after transmitting an ACK frame. There is a small probability that the ACK frame may get lost, thereby causing the retransmission of the FRM frame to fail repeatedly. Therefore, the FRM frame should be retried only a limited number of times after which the sending station may assume that the ACK got lost and that the receiving station has entered a sleep state until the specified TSF. The Suspend frame may then be transmitted via the access point to ensure that the receiving station also gets if in the event that the ACK was not lost.

Another implementation of the FRM power management process is to throttle the effective throughput on a direct link by creating relatively long suspend intervals or a large number of suspend intervals. However, a regular use of FRM power saving tunes the suspend period such that the sleep time is optimized, while the traffic stream does not become throttled. But applications may be conceivable which require some form of synchronization with other sources, in which case the FRM mechanism may be used in the throttling manner.

FRM power save should preferably be initiated by a single node only. This could be the node with the smallest MAC address, or the initiator of the link. For the FRM power management process, both peer stations preferably are in a power save mode with the access point.

In another embodiment, instead of a TSF timestamp, the FRM Suspend frame may contain a suspend period value relative to the end of the FRM Suspend frame. This value preferably is adapted for retries as part of the suspend interval will have passed when the retry finishes. A TSF timestamp may be implemented in instances where retransmissions are needed.

Furthermore, to save a frame exchange, the FRM suspend period can be piggybacked on a data frame by concatenation. In one embodiment, a frame encapsulation format is implemented to include of one or more control blocks in addition to a data payload. Possible piggybacked control blocks include the FRM and the Link Margin Information Element.

Additionally, the FRM suspend time can be conveyed in bits 8-15 of the QoS Control field of a QoS frame at the cost of some granularity. This approach would save a separate FRM frame exchange. However, it will be appreciated that the coarse granularity and the potential possibility that an FRM frame can be concatenated with a data frame make using the QoS Control field a less-preferred option for implementation.

The FRM suspend periods ideally may cover the idle time of the direct link traffic stream, preferably such that frame transmissions become grouped and separated by a suspend duration of suitable duration. The following Upper Medium Access Control (UMAC) algorithm may be used to determine the FRM sleep time:

$$FRM_{SleepTime} = FRM_{Period} - R_xT_x\text{Time} \times C$$

where
$FRM_{SleepTime}$ Sleep time indicated in the FRM frame (translated into TSF time)
$FRM_{Period}$ Period after which an FRM is sent
$R_xT_x$Time Accumulative receive (Rx) and transmit (Tx) time, during the past FRM period
C Correction factor, to accommodate growth and additional transmit failures An FRM preferably is not sent when the FRMSleepTime is negative as this indicates that the direct link load is close to saturation. The FRMPeriod should be large enough for the sleep time to be considerable as compared to the overhead of the FRM suspend frame exchange itself, but not be so large that unecessarily long delays are introduced. A typical FRM period may be, for example, 10 microseconds (msec). A larger value optimizes the sleep time, but also introduces more delay. C corrects for possible growth of the traffic stream, and creates room for collisions that were not counted as part of the RxTxTme count. A typical vale for C, for example, is 2.0, which allows for the traffic load to double during each FRMPeriod. The power savings will be higher when C is smaller, but this also increases the reaction time to changing traffic loads.

When FRM power save is activated in the described way, traffic on the direct link may become grouped, followed by a concatenated FRM sleep period, as illustrated in FIG. 21. As FIG. 21 illustrates, FRM power management results in a concatenation of the idle time because transmissions are grouped. This optimizes the intra-flow time period during which time the stations can go to sleep.

FIGS. 22-28 illustrate an exemplary implementation of the SRM power management process. In one embodiment of the exemplary SRM power management process, a direct link is suspended by transmitting an SRM frame while the link remains suspended until an SRM-Resume-request is transmitted via the access point. The SRM power management process preferably is implemented in instances where the traffic load has become less than a certain threshold such that a direct link is no longer justified. Note that the wakeup granularity for SRM power saving is related to the DTIM period, which may not be fine enough to allow for intra-flow power saving.

Figure 22:
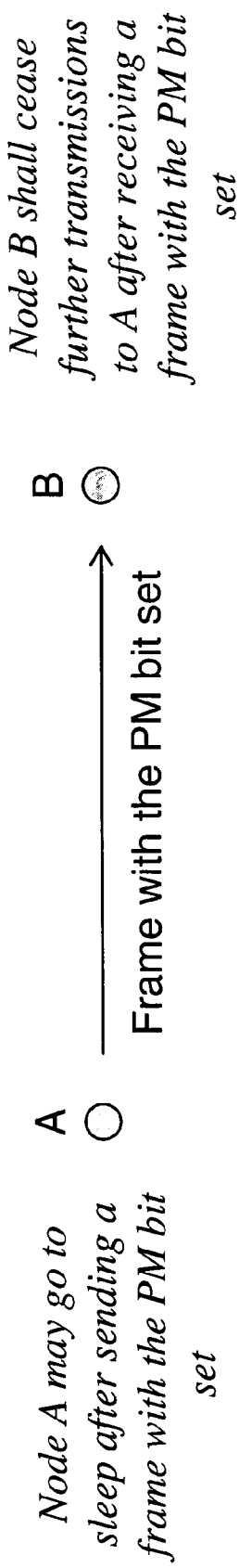

A direct link may be suspended by transmitting an acknowledged frame with a Power Management (PM) bit set, as shown in FIG. 22. In some cases this may include a Null frame. If the frame is successfully transmitted, the direct link is suspended and the peer stations may enter a sleep state. Alternatively, a direct link may be suspended when the PSM-Timeout passes without traffic (i.e. no Rx and no Tx).

Figure 23:

If a node is a Continually Awake Node (CAN), it may also suspend a direct link by sending a frame with the End of Service Period (EOSP) bit inside the QoS Control field set. This is shown in FIG. 23. The CAN preferably does not initiate any frame exchanges to the peer station after sending such an EOSP frame until it receives from the peer station a frame with the PM bit set to 0 or an FRM resume frame.

EOSP also may be used when neither station is a CAN. In this case, the link is suspended when both nodes have transmitted an EOSP frame to each other. Of course, a combination of EOSP and PM is also possible, but after the EOSP it typically is inconsequential as to whether the other station sends a PM or an EOSP frame because wither frame will suspend the link. It shoud noted that suspension as described above can also be applied in an IBSS environment.

In some instances, a PM or EOSP frame may cause the receiving station to enter a sleep state after transmitting the ACK frame. Therefore, the PM or EOSP frame should not be retried, or only a limited number of times. The transmitting station should assume that the ACK got lost and that the receiving station has entered a sleep state. Morevoer, PM and EOSP frames preferably are transmitted at a low rate to minimize reception errors.

Figure 24:
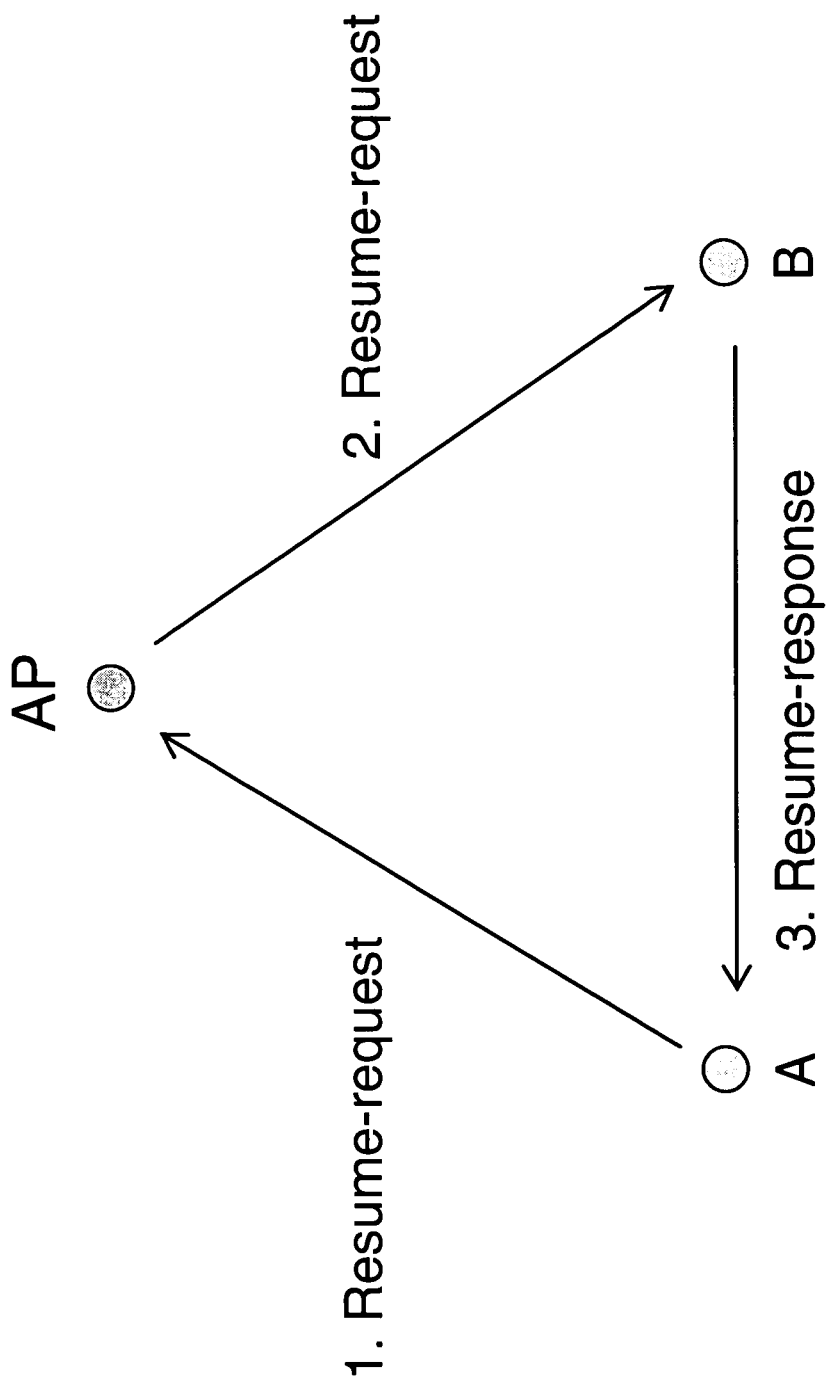
Figure 25:
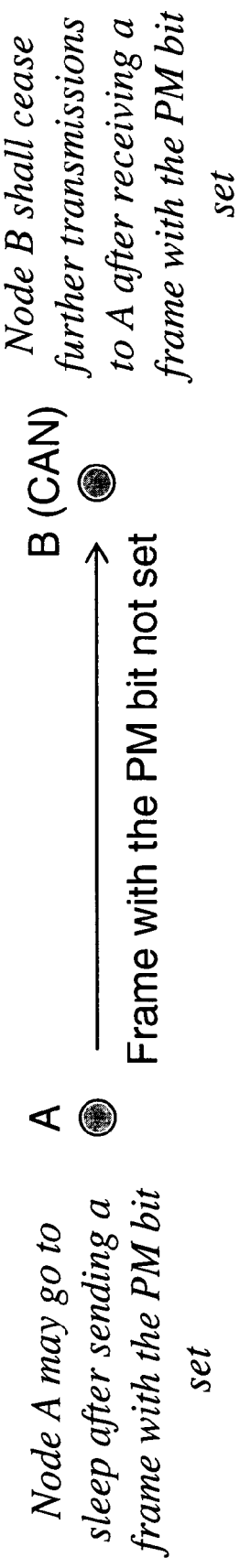
Figure 26:
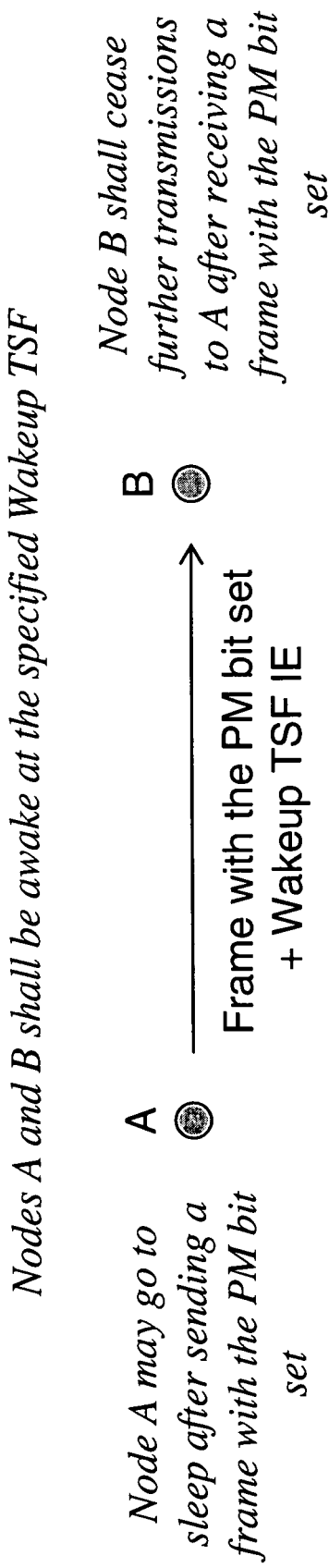

An SRM-suspended direct link may be resumed by sending a Resume-request frame to the peer station via the access point, after which the transmitting station stays awake until a Resume-response is received. The peer station receives the Resume-request from the access point, possibly through the power save delivery mechanism with DTIM and PS-Poll. The peer station then transmits a Resume-response directly to the requesting peer node and stays awake. This is illustrated in FIG. 24. The direct link may be resumed when the Resume-response frame is received.

When the direct link is suspended, the associated data frames preferably are transmitted via the access point. If the resulting traffic load exceeds the PSMWakeupThreshold, the direct link may be resumed by transmitting a Resume-request frame via the access point. Station A preferably waits for a period of at least the listen period of station B before assuming that the direct link has timed out. The listen period may be included in the direct link setup frames. If the peer node is a Continuously Awake Node (CAN), the direct link can be resumed by transmitting a frame directly to the CAN with the PM bit not set (see FIG. 25). Frames may be transmitted to a CAN at any time. The direct link also may be automatically resumed at a specified TSF timestamp, by piggybacking a TSF wakeup Information Element on the frame with the PM bit set (see FIG. 26). Both stations preferably are in an awake state at this time.

If the direct link is suspended with a Wakeup TSF, peer-to-peer traffic preferably is not transmitted via the access point because this would introduce reordering of frames due to the usually short period of the sleep period. The Wakeup TSF can also be included on EOSP frames, as illustrated in FIG. 27. Including a Wakeup TSF IE on an EOSP frame puts station A to sleep until the specified TSF.

Another technique for resuming the direct link includes the transmission of a short non-PM and non-EOPS frame during a scheduled wakeup window. The 802.11 IBSS power save mechanism defines such a mechanism for ad hoc networks (where there is no access point) and calls the window an ATIM window. During the ATIM window, nodes may transmit short ATIM frames if traffic is queued for a particular destination, which will cause a particular connection to be resumed. In the current standard, the ATIM window occurs immediately after the TBTT, but additional short ATIM windows may be scheduled in between TBTTs. The more ATIM windows are scheduled, the shorter they can be because the expected number of ATIM frames per ATIM window becomes smaller. A finer ATIM window granularity also reduces the wakeup delay.

ATIM frames are the only frames which conventionally are transmitted during an ATIM window so that the ATIM window does not become clogged with long data transmissions. An ATIM frame only announces the pending transmission of a data frame. A useful extension to the ATIM mechanism is to allow data frames, but limited to a certain duration or octet size. Applications with short frames (i.e. gaming) will benefit from this enhancement because no ATIM needs to be transmitted. In summary, the ATIM power save mechanism can be applied to direct link, and it can be improved by adding short intra-TBTT ATIM windows and by allowing short data frames to be transmitted as well, during the ATIM period. The described resumption methods can also be used in an IBSS environment.

Figure 28:
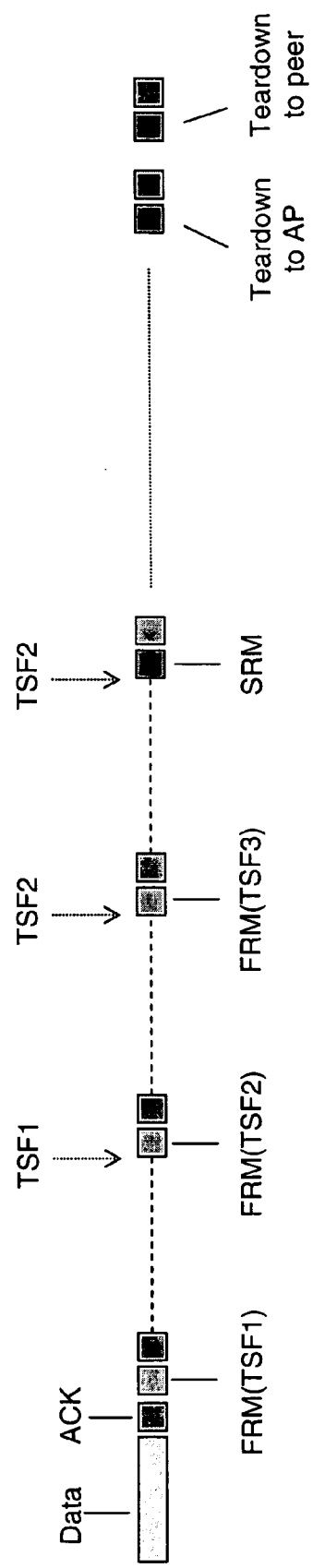

The Direct Link Teardown procedure may involve to the two tiered approached as described above by invoking SRM suspend before tearing down the link. The direct link is SRM suspended when the SRMTimeout expires and torn down when the IDLPTeardownTimeout expires. A typical scenario is illustrated in FIG. 28. As FIG. 28 illustrates, when the traffic flows stops, there will be several FRM suspends, then an SRM suspend and finally a teardown via the access point.

Figure 29:
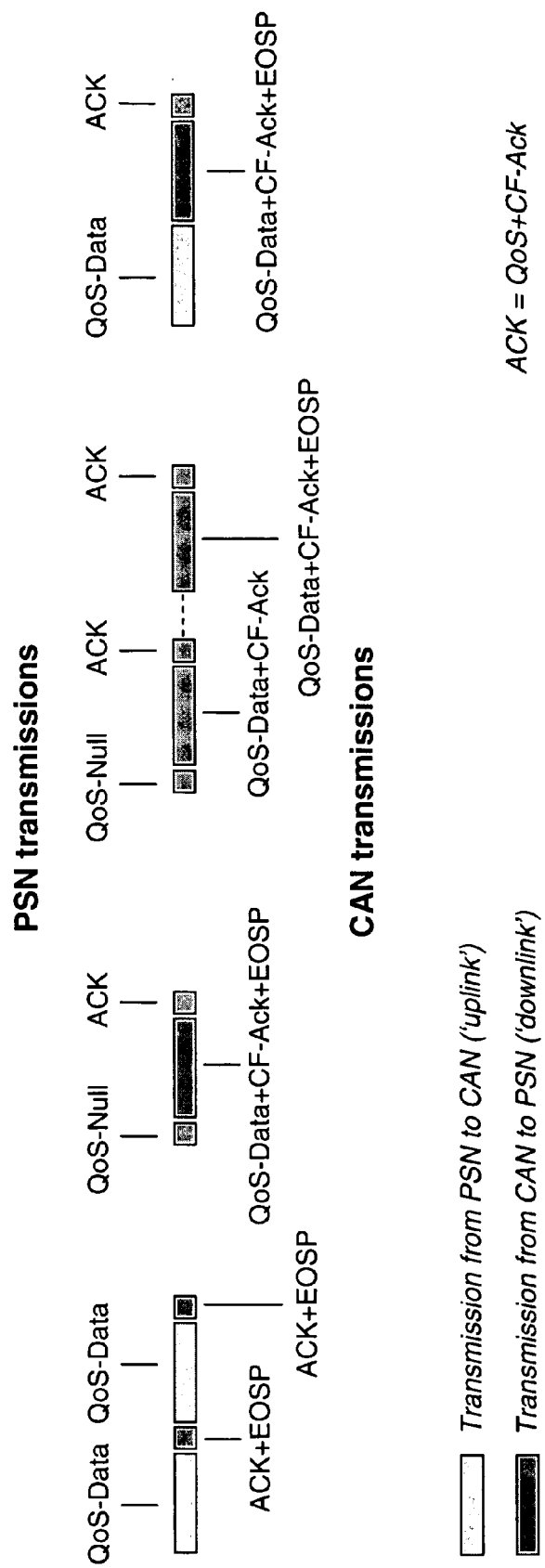

Referring now to FIG. 29, an exemplary implementation of the Reverse Polling Power Management process is illustrated. For the following, it is assumed that that one of the nodes on the Direct Link is a Continuously Awake Node (CAN). This capability may be indicated during the direct link setup procedure by including the CAN capability element. If a station does not include the CAN capability during the setup phase, it may be assumed that this node is a Power Save Node (PSN). Reverse Polling Power Management further is based on the assumption that QoS frames may be used on the direct link. The presence of a CAN on the Direct Link allows for the PSN to use Reverse Polling to initiate Service Periods.

Traffic to the CAN may be sent at any time, but traffic to the PSN preferably is transmitted only during the Service Period (SP). An SP starts when the PSN sends a frame to the CAN. An SP ends when the CAN sends an End of Service Period (EOSP) frame to the PSN by setting the EOSP bit inside the QoS Control field of the final frame of the SP. During the SP, the CAN may attempt to transmit all buffered traffic to the PSN. The More Data bit may be used to indicate whether more data is queued for the PSN.

The PS may include multiple TXOPs. During the SP, the CAN may interleave traffic to other destinations, but this preferably is minimized to save power at the PSN. This implies that if the CAN starts sending traffic to another destination, it preferably sends an EOSP frame first.

The PSN may indicate that it will be in a Power Save mode (i.e. not in an awake mode) by setting the Power Management (PM) bit on frames that are sent to the CAN. During this time, data to the PSN preferably is sent only during the Service Period (SP). Note that during the SP, the PSN sets the PM bit to 1 in all frames, even though it will stay awake until the end of the SP. The PM bit on frames received from a CAN shall be ignored. If the CAN receives from the PSN a frame with the PM bit set to 0, it can assume that the PSN is in the awake mode.

The PSN preferably checks for the presence of data at the CAN by sending a QoS-Null frame every 10 msec, for example, so that an SP is started every 10 msec. If the CAN has no data queued, it may respond with an QoS+CF-ACK frame with the MD bit set to 0 and the EOSP bit set to 1. Alternatively, the CAN may send an ACK first, followed by a QoS-Null frame with the MD bit set to 0 and the EOSP bit set to 1.

The acknowledgement to an EOSP frame may get lost, which is denoted as a lost-ACK case. The PSN will go to sleep while the CAN attempts to retransmit the EOSP frame. To avoid needless retransmissions, the CAN preferably limits the number of retries for an EOSP frame to a predetermined number and assumes that there is a lost ACK condition after that. If the EOSP frame was a data frame, the CAN may retransmit this frame as the first frame of the next Service Period. The scheduling of poll frames may be optimized to respond dynamically to changing traffic conditions. Frame exchanges within the SP shall follow the regular (WME) channel access rules.

It is conceivable that FRM power saving may be used during the Service Period. The CAN preferably keeps SPs as short and dense as possible, but long enough to empty the queue. Assuming that the CAN will indeed do so, FRM can safely be disabled on Direct Links where a CAN is present.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for power management of a direct wireless link between a first and second wireless device, the method comprising:
    at the first wireless device, establishing a direct wireless link with the second wireless device, the first and second wireless devices forming a wireless ad hoc network or operating as clients of a same wireless infrastructure network;
    transmitting, from the first wireless device to the second wireless device via the direct wireless link, a frame including a time value indicating a time duration that both the first wireless device and second wireless device should enter a power save mode;
    at the first wireless device, entering a power save mode and suspending the direct wireless link for a duration determined based on the time value; and
    exiting from the power save mode and resuming the direct wireless link at a time determined based on the time value.

2. The method of claim 1, wherein the time value is a suspend period based on an end of the frame.

3. The method of claim 1, wherein the time value is a timestamp indicating a future time at which the first and second wireless devices should exit the power save mode and resume the direct wireless link.

4. The method of claim 1, wherein the first and second wireless devices are clients of a same wireless infrastructure network, and the first wireless device is in a power save mode relative to an access point in the same wireless infrastructure network.

5. The method of claim 1, wherein the frame including the time value is transmitted from the first wireless device to the second wireless device at a transmission rate below the maximum supported transmission rate between the first and second wireless devices.

6. The method of claim 1, wherein, in the event that no acknowledgment of the transmitted frame including the time value is received by the first wireless device, the first wireless device re-transmitting the frame a limited number of times before stopping re-transmission and entering the power save mode.

7. A method for power management of a direct wireless link between a first and second wireless device, the method comprising:
    at the second wireless device, establishing a direct wireless link with the first wireless device, the first and second wireless devices forming a wireless ad hoc network or operating as clients of a same wireless infrastructure network;
    receiving via the wireless direct link, from the first wireless device to the second wireless device, a frame including a time value indicating a time duration that both the first wireless device and second wireless device should enter a power save mode;
    at the second wireless device, entering a power save mode and suspending the direct wireless link for a duration determined based on the time value; and
    exiting from the power save mode and resuming the direct wireless link at a time determined based on the time value.

8. The method of claim 7, further comprising:
    at the first wireless device, exiting from the power save mode and resuming the direct wireless link at a time determined based on the time value; and
    at the second wireless device, exiting from the power save mode and resuming the direct wireless link at a time determined based on the time value.

9. A first wireless device adapted to manage the power of a direct wireless link with a second wireless device, the first and second wireless devices forming a wireless ad hoc network or operating as clients of a same wireless infrastructure network, the first wireless device comprising a processor adapted to:
    establish a direct wireless link with the second wireless device;
    generate and transmit a frame via the direct wireless link including a time value to the second wireless device, the time value indicating a time duration that both the first wireless device and second wireless device should enter a power save mode;
    enter a power save mode and suspend the direct wireless link for a duration determined based on the time value; and
    exit the power save mode and resume the direct wireless link at a time determined based on the time value.

10. The first wireless device of claim 9, wherein the time value is a suspend period based on an end of the frame.

11. The first wireless device of claim 9, wherein the time value is a timestamp indicating a future time at which the first and second wireless devices should exit the power save mode and resume the direct wireless link.

12. The first wireless device of claim 9, wherein the first and second wireless devices are clients of a same wireless infrastructure network, and the first wireless device is in a power save mode relative to an access point in the same wireless infrastructure network.

13. The first wireless device of claim 9, wherein the processor is adapted to transmit the frame including the time value from the first wireless device to the second wireless device at a transmission rate below the maximum supported transmission rate between the first and second wireless devices.

14. The first wireless device of claim 9, wherein in the event that no acknowledgment of the transmitted frame including the time value is received by the first wireless device, the processor is configured to re-transmit the frame a limited number of times before stopping re-transmission and entering the power save mode.

15. A second wireless device adapted to manage the power of a direct wireless link with a first wireless device, the first and second wireless devices forming a wireless ad hoc network or operating as clients of a same wireless infrastructure network, the second wireless device comprising a processor adapted to:
    establish a direct wireless link with the first wireless device;
    receive a frame via the direct wireless link including a time value from the first wireless device, the time value indicating a time duration that both the first wireless device and second wireless device should enter a power save mode;
    enter a power save mode and suspend the direct wireless link for a duration determined based on the time value; and
    exit the power save mode and resume the direct wireless link at a time determined based on the time value.

16. The second wireless device of claim 15, wherein the time value is a suspend period based on an end of the frame.

17. The second wireless device of claim 15, wherein the time value is a timestamp indicating a future time at which the first and second wireless devices should exit the power save mode and resume the direct wireless link.

18. The second wireless device of claim 15, wherein the first and second wireless devices are clients of a same wireless infrastructure network, and the second wireless device is in a power save mode relative to an access point in the same wireless infrastructure network.

19. A method for power management of a direct wireless link between a first wireless device and a second wireless device in the presence of an access point, the method comprising:
at the first wireless device, establishing a direct wireless link with the second wireless device;
transmitting from the first wireless device to the second wireless device via the direct wireless link, or receiving at the first wireless device from the second wireless device via the direct wireless link, a first frame including a power management bit set indicating that the direct wireless link should be suspended and that the first and second wireless devices should enter a power save state;
at the first wireless device, suspending the direct wireless link and entering the power save state;
at the first wireless device, exiting the power save state and transmitting a first resume-request frame to the second wireless device via the access point; and
receiving, at the first wireless device from the second wireless device, a second resume-request frame via the direct wireless link.

20. A method for power management of a direct wireless link between a first wireless device and a second wireless device in the presence of an access point, the method comprising:
at the second wireless device, establishing a direct wireless link with the first wireless device;
transmitting from the second wireless device to the first wireless device via the direct wireless link, or receiving at the second wireless device from the first wireless device via the direct wireless link, a first frame including a power management bit set indicating that the direct wireless link should be suspended and that the first and second wireless devices should enter a power save state;
at the second wireless device, suspending the direct wireless link and entering the power save state;
at the second wireless device, receiving a first resume-request frame from the first wireless device via the access point; and
exiting the power save state and wirelessly transmitting a second resume-request frame to the first wireless device via the direct wireless link.

21. The method of claim 20, wherein the second wireless device is in a power save mode with the access point, and receives the first resume-request frame from the access point utilizing a power-save delivery mechanism.

22. A first wireless device adapted to manage the power of a direct wireless link with a second wireless device in the presence of an access point, the first wireless device comprising a processor adapted to:
establish a direct wireless link with the second wireless device;
transmit to the second wireless device via the direct wireless link, or receive from the second wireless device via the direct wireless link, a first frame including a power management bit set indicating that the direct wireless link should be suspended and that the first and second wireless devices should enter a power save state;
suspend the direct wireless link and enter a power save state;
exit the power save state and transmit a first resume-request frame to the second wireless device via the access point; and
receive from the second wireless device a second resume-request frame via the direct wireless link.

23. A second wireless device adapted to manage the power of a direct wireless link with a first wireless device in the presence of an access point, the second wireless device comprising a processor adapted to:
establish a direct wireless link with the first wireless device;
receive from the first wireless device via the direct wireless link, or transmit to the first wireless device via the direct wireless link, a first frame including a power management bit set indicating that the direct wireless link should be suspended and that the first and second wireless devices should enter a power save state;
suspend the direct wireless link and enter a power save state;
receive a first resume-request frame from the first wireless device via the access point; and
exit the power save state and transmit a second resume-request frame to the first wireless device via the direct wireless link.

24. The second wireless device of claim 23, wherein the second wireless device is in a power save mode with the access point, and receives the first resume-request frame from the access point utilizing a power-save delivery mechanism.

25. A method for power management of a direct wireless link between a first wireless device and a second wireless device, the method comprising:
at the first wireless device, establishing a direct wireless link between the first wireless device and the second wireless device in which the first wireless device indicates to the second wireless device that it is a continuously awake node, the first and second wireless devices forming a wireless ad hoc network or operating as clients of a same wireless infrastructure network;
at the first wireless device, not sending but instead buffering data intended for transmission to the second wireless device via the direct wireless link;
receiving a QoS-Null frame at the first wireless device from the second wireless device indicating the start of a service period in which the second wireless device is not in power save mode;
the first wireless transmitting at least a portion of the buffered data to the second wireless device within the service period.

26. The method of claim 25, wherein the first wireless device transmits all of the buffered data to the second wireless device, and sets an End Of Service Period (EOSP) bit in a QoS frame to indicate that no more data will be transmitted in the service period.

27. A method for power management of a direct wireless link between a first wireless device and a second wireless device, the method comprising:
at the second wireless device, establishing a direct wireless link between the first wireless device and the second wireless device in which the first wireless device indicates to the second wireless device that it is a continuously awake node, the first and second wireless devices forming a wireless ad hoc network or operating as clients of a same wireless infrastructure network;

at the second wireless device, sending notification to the first wireless device that the second wireless device is entering a power save mode;

at the second wireless device, exiting the power save mode and sending a QoS-Null frame to the first wireless device to indicate the start of a service period in which the second wireless device is not in the power save mode and is available to receive data via the direct wireless link;

at the second wireless device, receiving a QoS frame via the direct wireless link indicating that the service period should end; and re-entering the power save mode.

28. The method of claim 27, wherein the second wireless device exits power save mode and transmits the QoS-Null frame to the first wireless device at a regular periodic interval.

29. The method of claim 28, wherein the regular periodic interval is substantially every 10 msec.

30. A first wireless device adapted to manage the power of a direct wireless link with a second wireless device, the first and second wireless devices forming a wireless ad hoc network or operating as clients of a same wireless infrastructure network, the first wireless device comprising a processor adapted to:

establish a direct wireless link with the second wireless device in which the first wireless device indicates to the second wireless device that it is a continuously awake node;

not send but instead buffer data intended for transmission to the second wireless device via the direct wireless link;

receive a QoS-Null frame at the first wireless device from the second wireless device indicating the start of a service period in which the second wireless device is not in a power save mode;

transmit at least a portion of the buffered data to the second wireless device within the service period.

31. The first wireless device of claim 30, wherein the processor is further adapted to:

transmit all of the buffered data to the second wireless device, and set an End Of Service Period (EOSP) bit in a QoS frame to indicate that no more data will be transmitted in the service period.

32. A second wireless device adapted to manage the power of a direct wireless link with a first wireless device, the first and second wireless devices forming a wireless ad hoc network or operating as clients of a same wireless infrastructure network, the first wireless device comprising a processor adapted to:

establish a direct wireless link between the first wireless device and the second wireless device in which the first wireless device indicates to the second wireless device that it is a continuously awake node;

send notification to the first wireless device that the second wireless device is entering a power save mode;

exit the power save mode and send a QoS-Null frame to the first wireless device to indicate the start of a service period in which the second wireless device is not in the power save mode and is available to receive data via the direct wireless link;

receive a QoS frame from the first wireless device via the direct wireless link indicating that the service period should end; and re-entering the power save mode.

33. The second wireless device of claim 32, wherein the QoS frame includes an End Of Service Period (EOSP) bit set to indicate that no more data will be transmitted in the service period.

34. The method of claim 7, wherein the time value is a suspend period based on an end of the frame.

35. The method of claim 7, wherein the time value is a timestamp indicating a future time at which the first and second wireless devices should exit the power save mode and resume the direct wireless link.

36. The method of claim 7, wherein the first and second wireless devices are clients of a same wireless infrastructure network, and the second wireless device is in a power save mode relative to an access point in the same wireless infrastructure network.

37. The method of claim 7, wherein the frame including a time value is transmitted from the first wireless device to the second wireless device at a transmission rate below the maximum supported transmission rate between the first and second wireless devices.

* * * * *